US012699960B2

(12) United States Patent
Ito et al.

(10) Patent No.: US 12,699,960 B2
(45) Date of Patent: Aug. 4, 2026

(54) INFORMATION PROCESSING DEVICE, INFORMATION PROCESSING SYSTEM, AND METHOD OF CONTROLLING INFORMATION PROCESSING DEVICE

(71) Applicant: TOSHIBA TEC KABUSHIKI KAISHA, Tokyo (JP)

(72) Inventors: Kenji Ito, Ota Tokyo (JP); Makoto Sato, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 110 days.

(21) Appl. No.: 18/632,336

(22) Filed: Apr. 11, 2024

(65) Prior Publication Data

US 2025/0069032 A1 Feb. 27, 2025

(30) Foreign Application Priority Data

Aug. 21, 2023 (JP) ................................. 2023-134070

(51) Int. Cl.
*G06Q 10/087* (2023.01)
*G06T 7/70* (2017.01)
*G06V 30/10* (2022.01)

(52) U.S. Cl.
CPC ............. *G06Q 10/087* (2013.01); *G06T 7/70* (2017.01); *G06V 30/10* (2022.01)

(58) Field of Classification Search
CPC ......... G06Q 10/087; G06T 7/70; G06V 30/10
See application file for complete search history.

(56) References Cited

U.S. PATENT DOCUMENTS

| 7,845,560 B2 * | 12/2010 | Emanuel | ................... G01S 5/16 |
| | | | 235/472.01 |
| 9,171,278 B1 * | 10/2015 | Kong | ..................... B65G 1/137 |
| 9,561,941 B1 * | 2/2017 | Watts | ................... G05D 1/0268 |

(Continued)

FOREIGN PATENT DOCUMENTS

JP          2020-19647          2/2020

OTHER PUBLICATIONS

Özgür, Çagdas, Cyril Alias, and Bernd Noche. "Comparing sensor-based and camera-based approaches to recognizing the occupancy status of the load handling device of forklift trucks." Logistics Journal: Proceedings May 2016 (2016). (Year: 2016).*

*Primary Examiner* — Nathan A Mitchell
(74) *Attorney, Agent, or Firm* — Turocy & Watson, LLP

(57) ABSTRACT
An information processing device according to an embodiment includes a first acquisition unit, a first recognition unit, a second recognition unit, a second acquisition unit, and an output unit. The first acquisition unit obtains an image from a camera installed in a moving vehicle. The first recognition unit recognizes a symbol attached to the article from the image to obtain identification information for identifying the article from the symbol. The second recognition unit recognizes an action performed on the article by the moving vehicle based on a change in size of the symbol recognized by the first recognition unit from the image. The second acquisition unit obtains location information of the article when an action of the moving vehicle is recognized. The output unit outputs association information obtained by associating the identification information and the location information of the article with each other.

20 Claims, 27 Drawing Sheets

(56)                    References Cited

U.S. PATENT DOCUMENTS

| | | | | |
|---|---|---|---|---|
| 10,831,211 B1 * | 11/2020 | Desai | .................... | G05D 1/0246 |
| 12,242,916 B2 * | 3/2025 | Plummer | ................ | G06T 7/248 |
| 12,403,608 B2 * | 9/2025 | Wang | ..................... | B25J 9/1697 |
| 2007/0282482 A1 * | 12/2007 | Beucher | ................. | G06Q 10/08 |
| | | | | 700/226 |
| 2012/0126000 A1 * | 5/2012 | Kunzig | ..................... | G06T 7/73 |
| | | | | 235/385 |
| 2017/0225891 A1 * | 8/2017 | Elazary | ................ | G05D 1/0234 |
| 2020/0239231 A1 * | 7/2020 | Johnson | ................. | B25J 9/1679 |
| 2023/0092401 A1 * | 3/2023 | Plummer | ........... | G06K 7/10722 |
| | | | | 235/462.41 |
| 2023/0219761 A1 * | 7/2023 | Garifi | .................. | B65G 1/0492 |
| | | | | 700/218 |

* cited by examiner

*FIG. 4*

┌─────────────────────────────────────┐ ⌐DA
│                                      │
│  LIST                                │
│                              ⌐AR     │
│  ┌──────────────┬──────────────┐     │
│  │ ARTICLE NAME │   LOCATION   │     │
│  ├──────────────┼──────────────┤     │
│  │    12345     │   A-12-3     │     │
│  ├──────────────┼──────────────┤     │
│  │    ABCDE     │   D-4-1      │     │
│  ├──────────────┼──────────────┤     │
│  │   あいうえお    │   E-10-2     │     │
│  └──────────────┴──────────────┘     │
│         ⋮              ⋮             │
│                                      │
└─────────────────────────────────────┘

*FIG. 5*

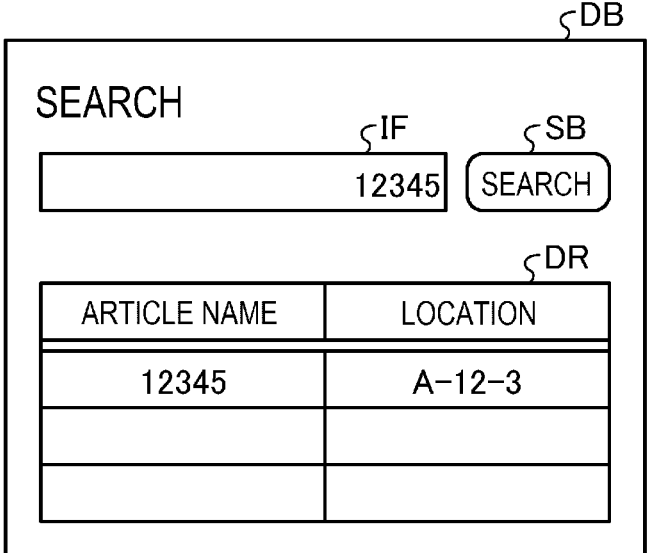

| ARTICLE NAME | LOCATION |
|---|---|
| 12345 | A-12-3 |
|  |  |
|  |  |

CPU

511

COMMUNICATION CONTROL UNIT

512

FIRST ACQUISITION UNIT

513

FIRST RECOGNITION UNIT

514

SECOND RECOGNITION UNIT

515

THIRD RECOGNITION UNIT

516

SECOND ACQUISITION UNIT

INSERT FORK

| 11 | 21 |
|---|---|
| SERVER DEVICE | CAMERA DEVICE (INFORMATION PROCESSING DEVICE) |

N

4

DRIVE CONTROL DEVICE

11

SERVER DEVICE

47

CPU

42

RAM

43

ROM

44

STORAGE

45

COMMUNICATION I/F

46

USER I/F

*FIG. 35*

INFORMATION PROCESSING DEVICE, INFORMATION PROCESSING SYSTEM, AND METHOD OF CONTROLLING INFORMATION PROCESSING DEVICE

CROSS-REFERENCE TO RELATED APPLICATION

This application is based upon and claims the benefit of priority from Japanese Patent Application No. 2023-134070, filed on Aug. 21, 2023, the entire contents of which are incorporated herein by reference.

FIELD

An embodiment of the present disclosure relates to an information processing device, an information processing system, and a method of controlling an information processing device.

BACKGROUND

In the past, there was known a system which obtains location information of a location where an article is placed, and then associates the location information thus obtained with identification information of the article to thereby manage the location of the article in a warehouse in which articles are arranged in a free-location manner. In such a system, picking-up (loading) of an article and unloading of the article are recognized by receiving input from a user.

DESCRIPTION OF THE DRAWINGS

FIG. 4 is a diagram showing an example of a display screen generated by the server device.

FIG. 5 is a diagram showing an example of the display screen.

FIG. 8 is a schematic diagram showing the example of the installation positions of the cameras.

FIG. 11 is a diagram illustrating an example of the processing of recognizing the picking-up.

FIG. 35 is a schematic diagram showing an example of the installation positions of the camera and the gyro sensor.

DETAILED DESCRIPTION

A problem to be solved by the embodiment of the present disclosure is to enhance convenience of article management in a warehouse where articles are arranged in a free-location manner.

An information processing device according to an embodiment includes a first acquisition unit, a first recognition unit, a second recognition unit, a second acquisition unit, and an output unit. The first acquisition unit obtains an image from a camera installed in a moving vehicle for conveying an article. The first recognition unit recognizes a symbol attached to the article from the image to obtain identification information for identifying the article from the symbol. The second recognition unit recognizes an action performed on the article by the moving vehicle based on a change in size of the symbol recognized by the first recognition unit from the image. The second acquisition unit obtains location information of the article when an action of the moving vehicle is recognized. The output unit outputs association information obtained by associating the identification information of the article represented by the symbol and the location information of the article with each other in accordance with an action content recognized by the second recognition unit.

Some embodiments will hereinafter be described with reference to the drawings.

First Embodiment

Figures 1, 2:
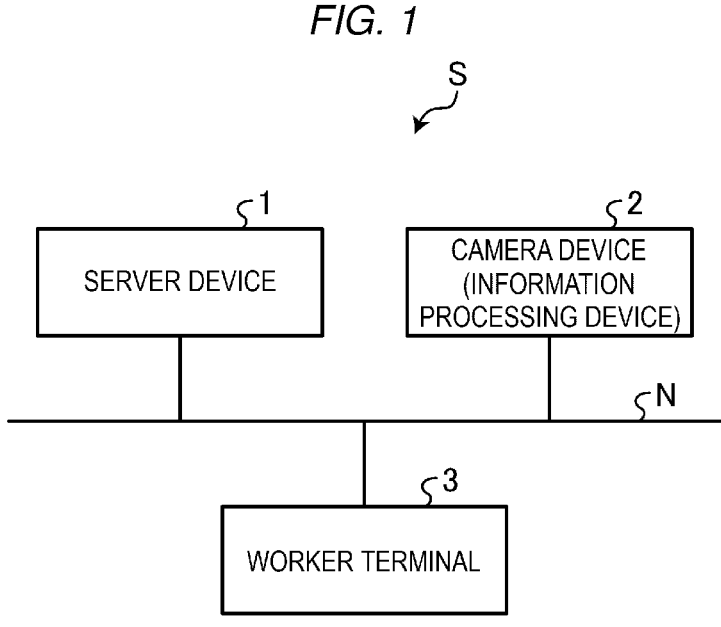
FIG. 1 is a block diagram showing an example of a configuration of an information processing system according to a first embodiment.
FIG. 2 is a block diagram showing an example of a hardware configuration of a server device related to the first embodiment.

FIG. 1 is a diagram showing an example of an overall configuration of an information processing system S according to a first embodiment. The information processing system S is provided with a server device 1, a camera device 2, and a worker terminal 3. The server device 1, the camera device 2, and the worker terminal 3 are coupled to each other so as to be able to communicate with each other with a network N.

It should be noted that one server device 1, one camera device 2, and one worker terminal 3 are coupled in FIG. 1, but the number of these devices are not limited thereto. For example, the information processing system S may be provided with two or more camera devices 2 and two or more worker terminal 3.

The server device 1 is a device for managing arrangement locations of articles in a warehouse where the articles are arranged in a free-location manner. Here, the warehouse means a facility for storing tangible articles, and is, for example, a warehouse of a distribution center. A configuration of the server device 1 will hereinafter be described using FIG. 2 through FIG. 5.

First, a hardware configuration of the server device 1 will be described. FIG. 2 is a block diagram showing an example of the hardware configuration of the server device 1 related to the first embodiment. The server device 1 is provided with a central processing unit (CPU) 41, a random access memory (RAM) 42, a read only memory (ROM) 43, a storage 44, a communication interface (I/F) 45, and a user I/F 46. These units 41 through 46 are coupled to each other via a data bus.

The CPU 41 performs overall control of the server device 1. For example, the CPU 41 uses the RAM 42 as a work area, and executes a program stored in the ROM 43, the storage 44, and so on to thereby execute a variety of types of processing. The storage 44 is a nonvolatile memory to which data can be written, and to which data can be rewritten.

The communication I/F 45 is a device for establishing communication of a predetermined type with the camera device 2 and the worker terminal 3. The type of the communication is not particularly limited, but what is compliant with a standard such as Ethernet (registered trademark) or IEEE 802.11 can be cited.

The user I/F 46 is a device which receives input from an operator of the server device 1 such as a system administrator, and makes it possible to output information to that operator. As the user I/F 46, there can be cited, for example, a keyboard, a pointing device, a display, and a speaker.

It should be noted that the configuration shown in FIG. 2 is illustrative only, and the hardware configuration of the server device 1 is not limited to the above. The server device 1 may be, for example, a system in which a plurality of computers operates in tandem with each other, or a system using cloud computing.

Figure 3:
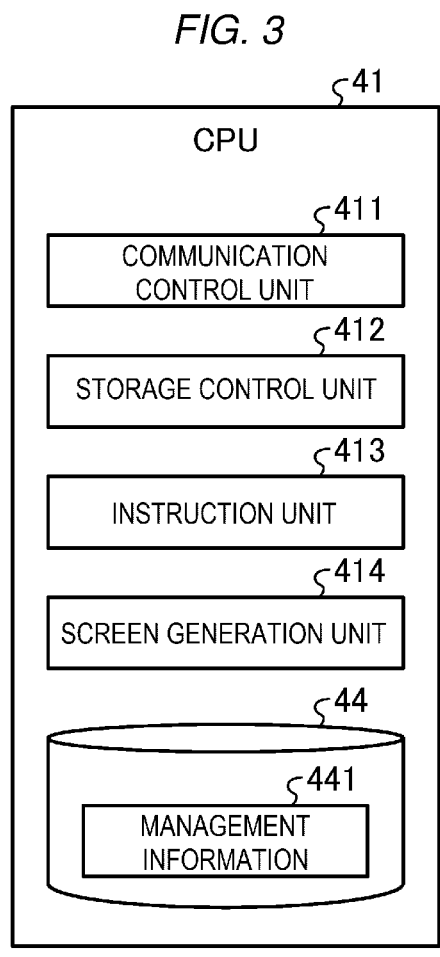
FIG. 3 is a block diagram showing an example of a functional configuration of the server device.

Then, a functional configuration of the server device 1 will be described. FIG. 3 is a block diagram showing an example of the functional configuration of the server device 1 related to the first embodiment. In the present embodiment, the CPU 41 of the server device 1 executes a program stored in the storage 44 or the like to thereby realize a variety of functions of the server device 1. The CPU 41 has a communication control unit 411, a storage control unit 412, an instruction unit 413, and a screen generation unit 414. Further, the storage 44 has management information 441.

The communication control unit 411 controls transmission and reception of information with the camera device 2 and the worker terminal 3. For example, the communication control unit 411 receives a variety of notices such as a notice that an article is in motion, a notice that reception of an article is completed, and a notice that shipping of an article is completed from the camera device 2 via the communication I/F 45. Further, for example, the communication control unit 411 transmits a reception instruction of an article, a shipping instruction of an article, a transfer instruction of an article, and so on to the worker terminal 3 in substantially the same manner.

The storage control unit 412 performs control of storing a variety of types of information in a storage device. For example, the storage control unit 412 performs control of storing article names and locations in the storage 44 in association with each other as the management information 441. The locations are an example of the positional information.

The instruction unit 413 generates instructions to workers who work in the warehouse. For example, when an article is unloaded in an arrival berth as a space for receiving articles, the instruction unit 413 generates the reception instruction which instructs the worker to perform reception processing of the article. The reception instruction thus generated is transmitted to the worker terminal 3 by the communication control unit 411.

Further, for example, when an instruction of shipping an article is received, the instruction unit 413 generates the shipping instruction of instructing the worker to perform shipping processing of moving the article stored on a shelf to a shipping berth as a space for shipping articles. The shipping instruction thus generated is transmitted to the worker terminal 3 by the communication control unit 411.

Further, for example, when an instruction of transferring an article is received, the instruction unit 413 generates the transfer instruction of instructing the worker to perform transfer processing of moving the article stored in a specific area to another area. The transfer instruction thus generated is transmitted to the worker terminal 3 by the communication control unit 411.

The screen generation unit 414 generates a variety of screens. Such screens may be image data represents the screens themselves, or may also be content data for displaying the screens in a device as a display destination. For example, when the screen generation unit 414 receives an instruction of displaying an article list display screen via the worker terminal 3, the screen generation unit 414 generates the article list display screen. The article list display screen is for displaying an article name and a location (a storage location) with respect to all the articles stored in the warehouse managed by the server device 1. The article list display screen thus generated is provided to, for example, the worker terminal 3 to thereby be displayed on a display 67 described later.

As an example, the screen generation unit 414 generates the article list display screen based on the management information 441 described later. Here, FIG. 4 is a diagram showing an example of the screen generated by the server device 1. FIG. 4 shows an example of the article list display screen DA.

As shown in FIG. 4, the article list display screen DA includes location display fields AR. The location display fields AR are for displaying article names and locations representing positions in the warehouse in which the articles are stored in association with each other. As an example, the first row of the location display fields shown in FIG. 4 represents that the article having the article name "12345" is stored at a location identified by the location "A-12-3" in the warehouse.

Further, for example, when the screen generation unit 414 receives an instruction of displaying an article search screen via the worker terminal 3, the screen generation unit 414 generates the article search screen. The article search screen is a screen for searching for an article stored in the warehouse managed by the server device 1. The article search screen thus generated is provided to, for example, the worker terminal 3 to thereby be displayed on the display 67 described later.

As an example, the screen generation unit 414 generates the article search screen for searching information registered in the management information 441 using the article name as a keyword. Here, FIG. 5 is a diagram showing an example of the screen generated by the server device 1. FIG. 5 shows an example of the article search screen DB. As shown in FIG. 5, the article search screen DB includes an input form IF, a search button SB, and result display fields DR.

The input form IF is a form for receiving input of an article name. A searcher such as the worker can search for the location of an article by inputting a name of the article in the input form IF. The search button SB is a button for determining the article name input in the input form IF. The searcher can search for the location of the article by inputting the article name in the input form IF, and then holding down the search button SB. The result display fields DR are display fields for displaying a search result.

As an example, the result display fields DR in the search screen DB shown in FIG. 5 shows an example of the search result when the searcher inputs "12345" in the input form IF and then holds down the search button SB. The result display fields DR shown in FIG. 5 represents the fact that the article having the article name "12345" is stored at the location identified by the location "A-12-3" in the warehouse.

It should be noted that the article list display screen DA and the article search screen DB described above may be displayed on a display device of other devices than the worker terminal 3. For example, the screens may be displayed on a display of a searching terminal not shown.

Further, the screens to be generated by the screen generation unit 414 are not limited to those described above. For example, it is possible to generate a screen for searching an article stored at a certain location from that location. Further, a variety of display screens may directly be generated by the worker terminal 3 or the like.

The management information 441 is information for managing the articles stored in the warehouse. For example, the management information 441 is what stores the article names and the locations where the articles are currently stored in association with each other. The management information 441 is updated by the storage control unit 412 in accordance with processing executed.

It should be noted that a program which makes the server device 1 execute the processing for realizing such functions as described above can be provided as a file in a installable format or an executable format recorded on a computer-readable recording medium such as a compact disc (CD) ROM, a flexible disk (FD), a CD-R (recordable), or a digital versatile disk (DVD). Further, the program may be provided or delivered via a network such as the Internet.

Referring back to FIG. 1, the explanation will be continued. The camera device 2 is a device which takes an image of the periphery of a forklift placed in the warehouse with a camera to assist management of the articles using the image thus taken. For example, the camera device 2 is mounted on the forklift. A configuration of the camera device 2 will hereinafter be described using FIG. 6 through FIG. 18.

Figure 6:
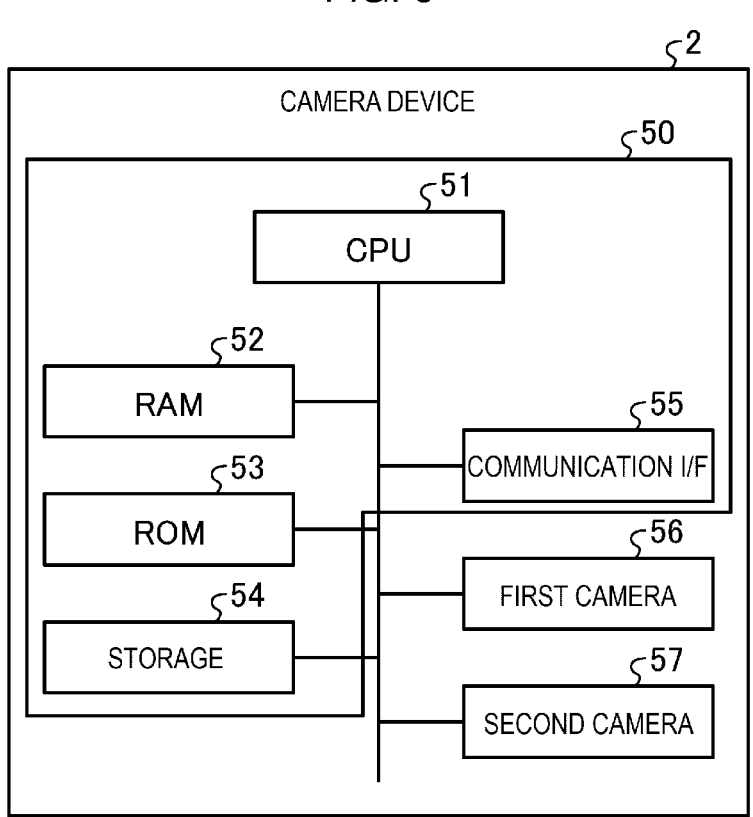
FIG. 6 is a block diagram showing an example of a hardware configuration of a camera device related to the first embodiment.

First, a hardware configuration of the camera device 2 will be described. FIG. 6 is a block diagram showing an example of the hardware configuration of the camera device related to the first embodiment. The camera device 2 is provided with a controller 50, a first camera 56, and a second camera 57.

The controller 50 is provided with a CPU 51, a RAM 52, a ROM 53, a storage 54, and a communication I/F 55. These constituents 51 through 55, the first camera 56, and the second camera 57 are coupled to each other via a data bus. It should be noted that the controller 50 and the first camera 56, and the controller 50 and the second camera 57 may each be coupled to each other with a wireless communication standard such as Bluetooth (registered trademark). The controller 50 is an example of an information processing device in the present disclosure.

The CPU 51 performs overall control of the camera device 2. For example, the CPU 51 uses the RAM 52 as a work area, and executes a program stored in the ROM 53, the storage 54, and so on to thereby execute a variety of types of processing. The storage 54 is a nonvolatile memory to which data can be written, and to which data can be rewritten. The communication I/F 55 is a device for establishing communication of a predetermined type with the server device 1 and the worker terminal 3.

The first camera 56 is a camera for recognizing a character string representing a name of an article as a target of processing. The character string representing the name of the target article is an example of a symbol. The second camera 57 is a camera for obtaining a location. The first camera 56 and the second camera 57 are provided to the forklift. The forklift is an example of a moving vehicle which conveys articles. An example of installation positions of the first camera 56 and the second camera 57 will hereinafter be described.

Figure 7:
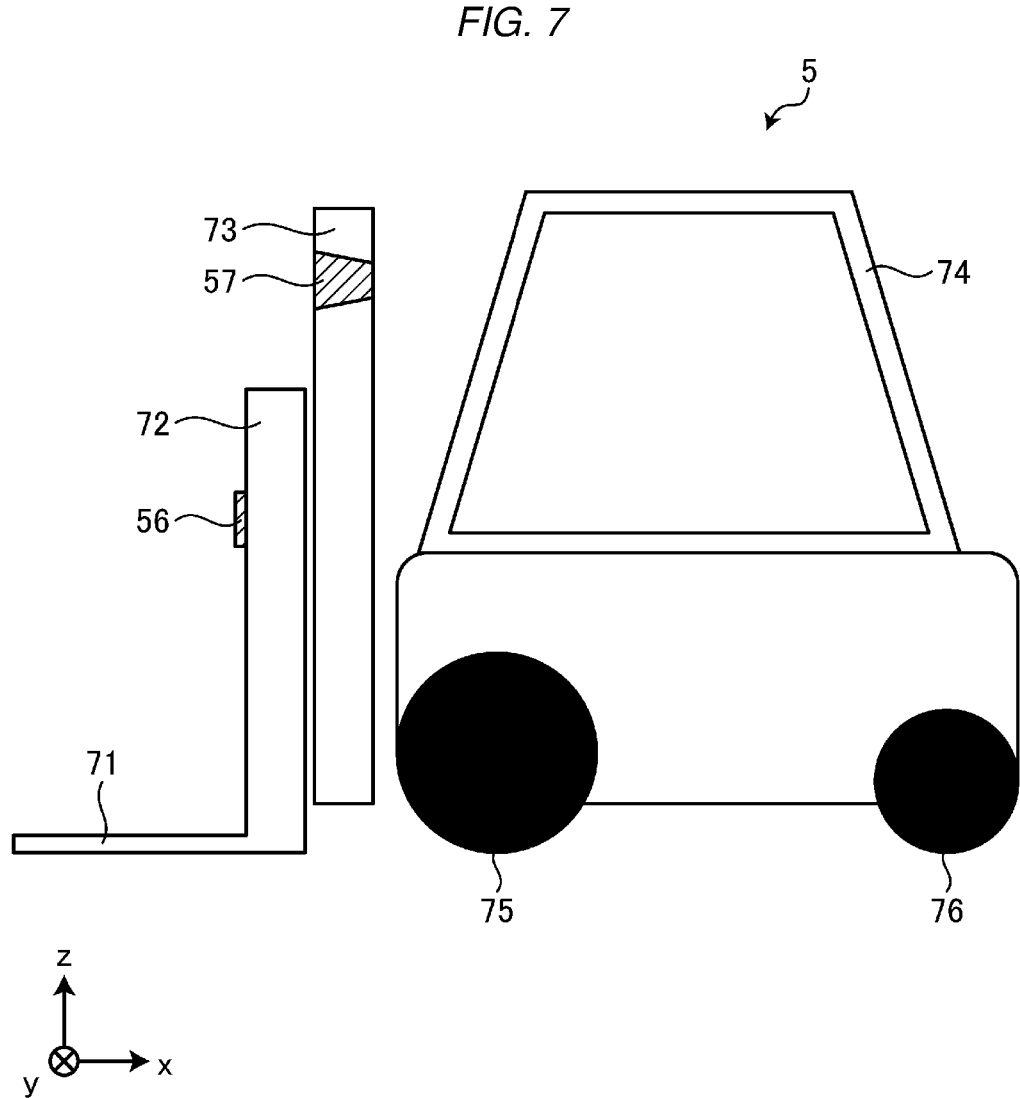
FIG. 7 is a schematic diagram showing an example of installation positions of cameras in a forklift related to the first embodiment.
Figure 8:
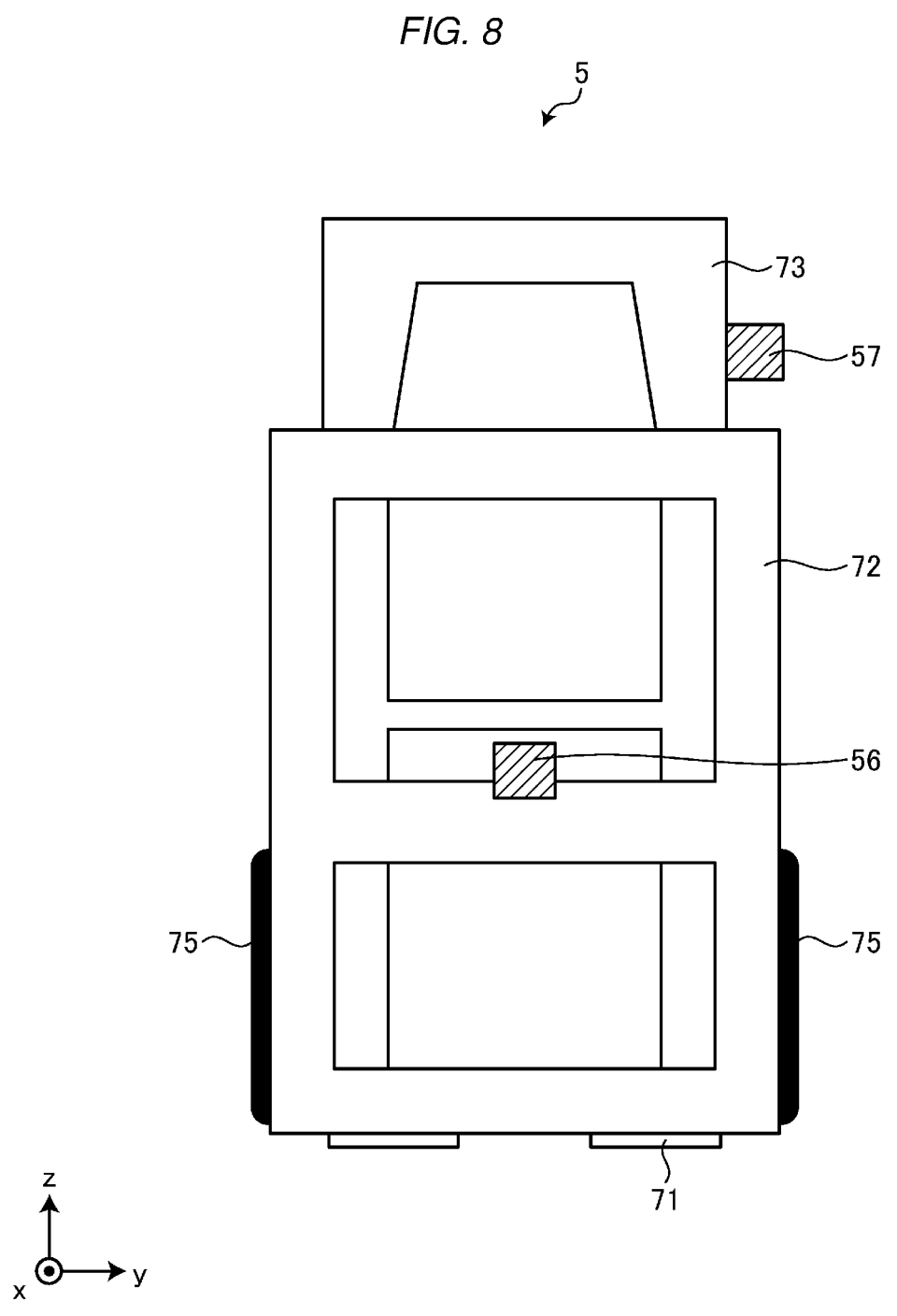

FIG. 7 and FIG. 8 are schematic diagrams showing an example of the installation positions of the cameras in the forklift related to the first embodiment. FIG. 7 shows an example of a view of the forklift from a lateral side. FIG. 8 shows an example of a view of the forklift from the front side.

As shown in FIG. 7 and FIG. 8, the forklift 5 is provided with a fork 71, a backrest 72, a mast 73, a head guard 74, drive wheels 75, and turning wheels 76. The fork 71 is a part used for lifting an article. The fork 71 may be called a pawl in some cases.

The backrest 72 is a part for preventing the article which is lifted by the fork 71 from dropping. The mast 73 is a part for moving up and down the fork 71 of the forklift 5. By sliding the mast 73 upward or downward, it is possible to pick up or set down the article. The head guard 74 is a part for protecting an operator of the forklift 5 from falling objects.

The drive wheels 75 are wheels which directly receive force generated by a motor, then convert the force into a rotational motion, and then move using the rotational motion. The turning wheels 76 are wheels for performing a steering action. In the present embodiment, the forklift 5 controls the drive wheels 75 and the turning wheels to run in the warehouse in accordance with operations of a worker.

In the present embodiment, the first camera 56 is disposed around a central portion of the backrest 72. Further, the second camera 57 is disposed in an upper part of the mast 73. It should be noted that although the two cameras, namely the first camera 56 and the second camera 57, are provided to the forklift 5 in the present embodiment, the number of the cameras may be one. In this case, the recognition of the character string representing the name of the target article and the recognition of the location are performed based on an image taken by the single camera.

Further, although it is assumed that the controller 50 is incorporated in the first camera 56 or the second camera 57 in the present embodiment, the controller 50 may be disposed as a separated body from the first camera 56 and the second camera 57, and may be disposed in the vicinity of a driving seat of the forklift 5. Further, a personal computer (PC) or the like installed in a place other than the forklift 5 and the first camera 56 and the second camera 57 may wirelessly coupled to each other, and the PC may play a role of the controller 50.

Figures 9, 10:
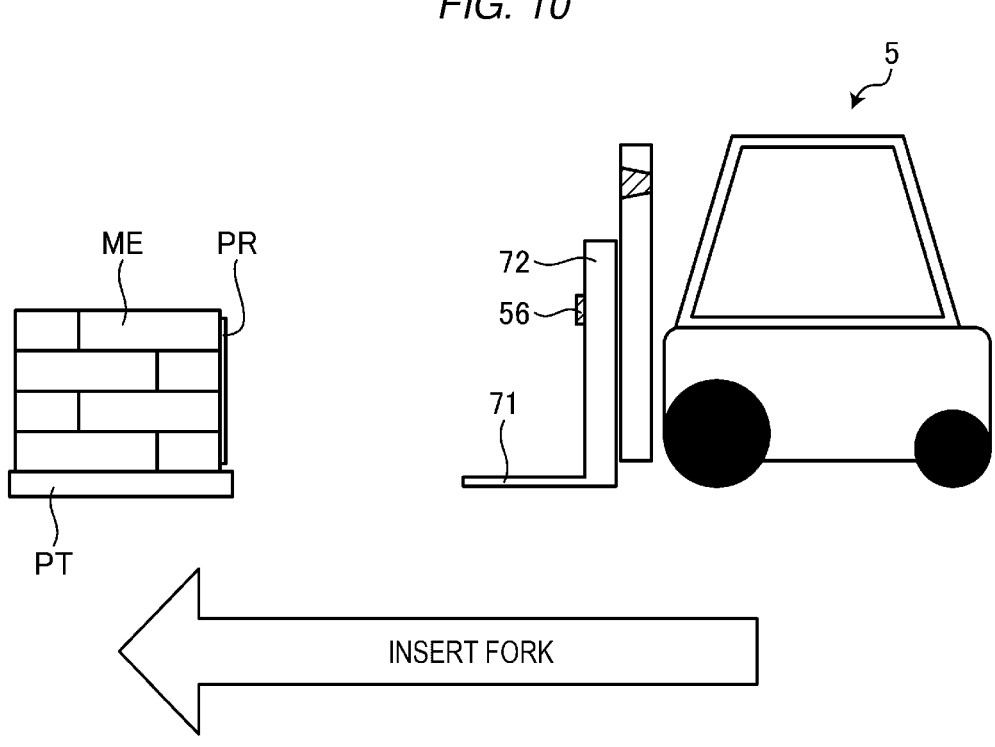
FIG. 9 is a block diagram showing an example of a functional configuration of the camera device.
FIG. 10 is a diagram illustrating an example of processing of recognizing picking-up of an article by the forklift related to the first embodiment.

Then, a functional configuration of the camera device 2 will be described. FIG. 9 is a block diagram showing an example of the functional configuration of the camera device 2 related to the first embodiment. In the present embodiment, the CPU 51 of the camera device 2 executes a program stored in the storage 54 or the like to thereby realize a variety of functions of the camera device 2. The CPU 51 has a communication control unit 511, a first acquisition unit 512, a first recognition unit 513, a second recognition unit 514, a third recognition unit 515, and a second acquisition unit 516.

The communication control unit 511 controls transmission and reception of information with the server device 1 and the worker terminal 3. For example, the communication control unit 511 transmits a variety of notices such as a notice that an article is in motion, a notice that reception of an article is completed, and a notice that shipping of an article is completed to the server device 1 via the communication I/F 55. Further, for example, the communication control unit 511 transmits a notice that an article is picked up, or a notice that an article is unloaded to the worker terminal 3 in substantially the same manner.

The first acquisition unit 512 obtains images from the cameras mounted on the forklift 5. For example, the first acquisition unit 512 obtains the images taken by the first camera 56 and the second camera 57 via the communication I/F in real time.

The first recognition unit 513 recognizes a symbol attached to an article from the image to obtain identification information, which can identify the article, from that symbol. For example, the first recognition unit 513 recognizes, as the symbol, a character string describing an article name of the target article which is included in the image obtained by the first acquisition unit 512, and obtains that character string as the article name which can identify the target article.

As an example, a slip describing a character string representing the article name is attached in advance to each of the articles stored in the warehouse. In the present embodiment, the first recognition unit 513 analyzes the image which is taken by the first camera 56, and is then obtained by the first acquisition unit 512 using a known image recognition technique. When the first recognition unit 513 recognizes that the symbol (in this case, the character string describing the article name) is included in that image, the first recognition unit 513 obtains that character string as the article name.

It should be noted that although the first recognition unit 513 recognizes the character string described the article name as the symbol in the present embodiment, the first recognition unit 513 may recognize a barcode, a two-dimensional code, or the like as the symbol.

The second recognition unit 514 recognizes an action which is performed by the forklift 5 on the article based on a change in size of the symbol included in the images temporally and continuously taken by the first acquisition unit 512. For example, the second recognition unit 514 recognizes that the forklift 5 picks up the target article based on the change in size of the symbol when the forklift 5 comes closer to the target article. The fact that the target article is picked up is an example of a first action.

For example, the second recognition unit 514 recognizes the fact that the forklift 5 picks up the target article based on the size of the character string obtained by the first recognition unit 513 as the article name of the target article in the image which is taken by the first camera 56 and is then obtained by the first acquisition unit 512. It should be noted that when recognizing a barcode, a two-dimensional code, or the like as the symbol, the fact that the target article is picked up is recognized based on the size of the barcode, the two-dimensional code, or the like.

Processing of the second recognition unit 514 recognizing the fact that the forklift 5 picks up the target article will hereinafter be described using FIG. 10 and FIG. 11. FIG. 10 is a diagram illustrating an example of the processing of recognizing the fact that the forklift 5 picks up the article.

FIG. 10 shows a condition in which the forklift 5 is coming closer to an article ME in order to pick up the article ME. In FIG. 10, the article ME is mounted on a pallet PT, and a slip PR on which the character string representing the article name of that article ME is described is attached to the article ME.

The forklift 5 inserts the fork 71 into the pallet PT to thereby pick up the article ME. On this occasion, the size of the character string described on the slip PR in the images taken by the first camera 56 disposed on the backrest 72 of the forklift 5 increases as the forklift 5 comes closer to the article ME.

Further, when the forklift 5 reaches a position where the forklift 5 can pick up the article ME, the forklift 71 raises the fork 71 without coming closer to the article ME. Therefore, in a period from when starting the picking-up of the article ME to when setting down the article ME to start withdrawing the fork 71 from the pallet PT, the change in size of the character string described on the slip PR in the image taken by the first camera 56 stops.

From this, the second recognition unit 514 makes it a rule to recognize that the forklift 5 completes picking-up of the target article when the change in size of the character string stops for more than a predetermined period. Here, FIG. 11 is a diagram illustrating an example of the processing of recognizing the fact that the forklift 5 picks up the article. FIG. 11 shows a time-series change in size of the character string WD described on the slip PR in the images taken by the first camera 56.

Figure 11:
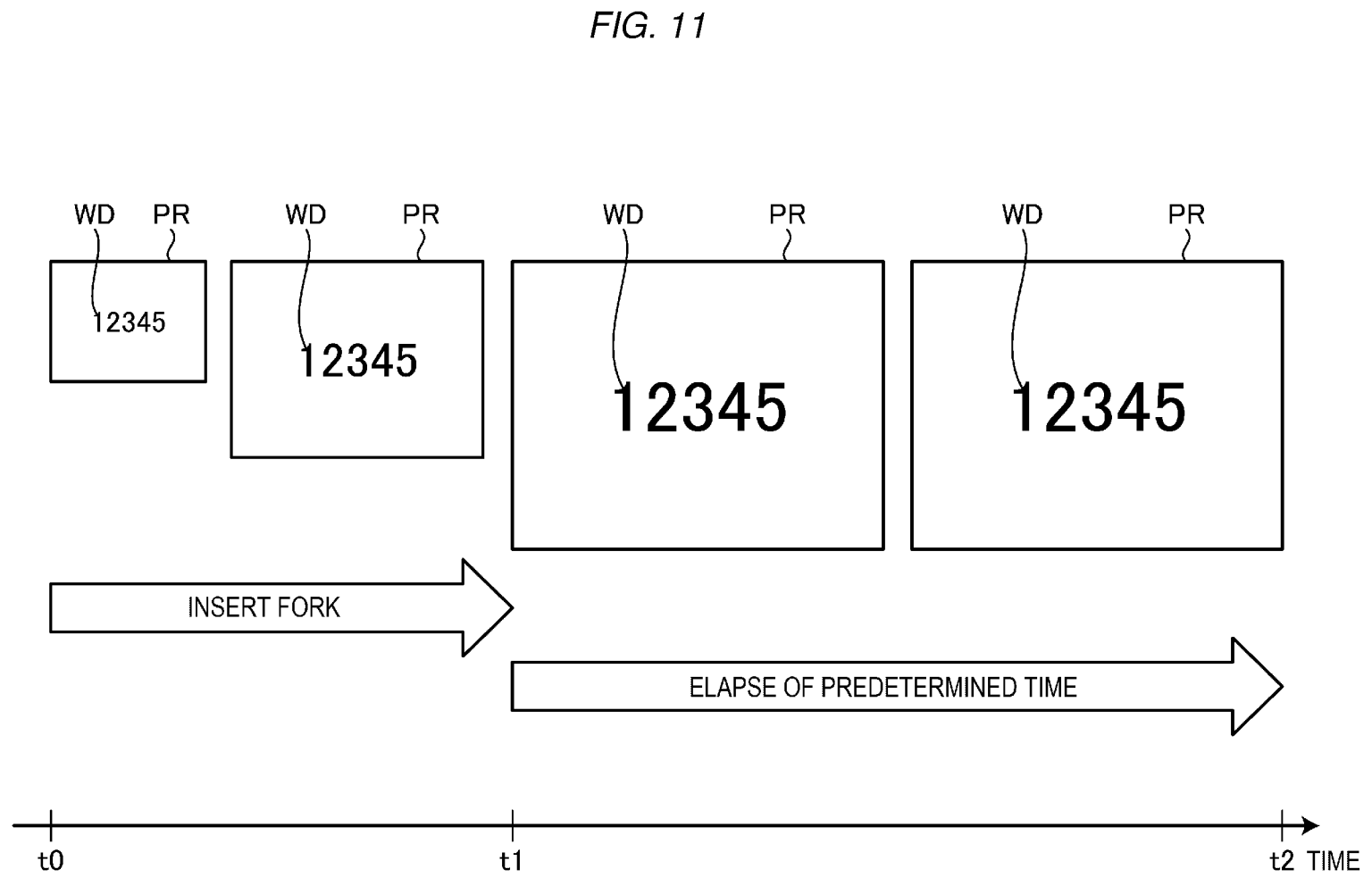

The horizontal axis of FIG. 11 represents time. In FIG. 11, it is assumed that the forklift 5 started the action of inserting the fork 71 into the pallet PT loaded with the article ME at time to in accordance with an operation of the worker as an operator of the forklift 5. Further, it is assumed that the forklift 5 started at time t1 an action of picking-up the article ME loaded on the pallet PT in which the fork 71 is inserted in substantially the same manner.

In a period from the time t0 to the time t1, the forklift 5 is coming closer to the article ME. Therefore, as shown in FIG. 11, the size of the character string WD described on the slip PR in the images taken by the first camera 56 continues to increase with time.

In contrast, at and after the time t1, the forklift 5 stops coming closer to or getting away from the article ME until the forklift 5 sets down the article ME and then starts the action of withdrawing the fork 71 from the pallet PT. Therefore, as shown in FIG. 11, the size of the character string WD described on the slip PR in the images taken by the first camera 56 stops changing at and after the time t1.

As an example, the second recognition unit 514 recognizes the time (the time t1 in FIG. 11) at which the size of the character string WD described on the slip PR stops changing based on the images which are taken by the first camera 56, and which are obtained in real time. Then, the second recognition unit 514 recognizes that the target article is picked up when the second recognition unit 514 recognizes that a predetermined time elapses from the time at which the size of the character string WD described on the slip PR stops changing (when the second recognition unit 514 recognizes that time t2 passes in FIG. 11).

Incidentally, even when the forklift 5 does not pick up the article ME, there is a possibility that the second recognition unit 514 erroneously recognizes that the target article is picked up when, for example, the forklift 5 stops on some grounds in a state in which the first camera 56 is taking the images of the character string WD described on the slip PR. Some methods of reducing the possibility of such erroneous recognition will hereinafter be described using FIG. 2 through FIG. 15.

First, a method of using the size of the character string in the image will be described. For example, the second recognition unit 514 recognizes that the target article is picked up when the size of the character string in the images taken by the first camera 56 does not change for a predetermined time, and at the same time, the size of the character string in the images exceeds a predetermined size.

Figure 12:
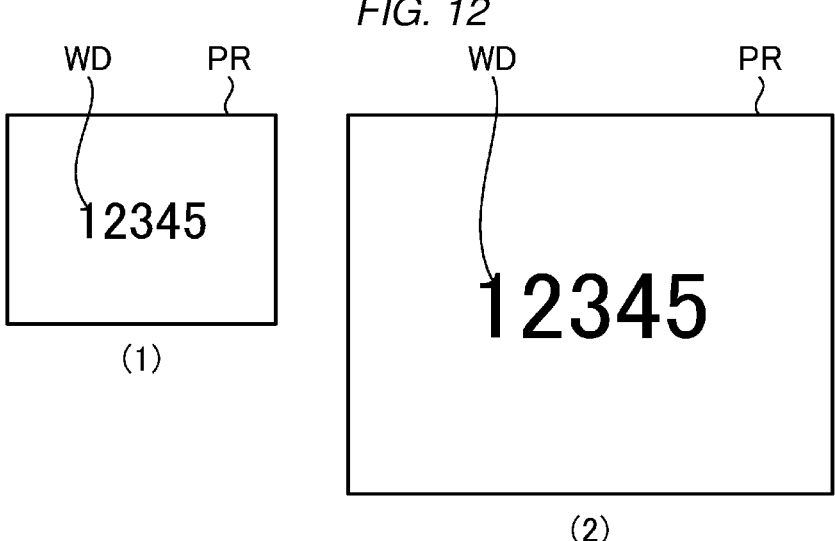
FIG. 12 is a diagram illustrating an example of the processing of recognizing the picking-up.

FIG. 12 is a diagram illustrating an example of the processing of recognizing the fact that the forklift 5 picks up the article. A diagram (1) in FIG. 12 shows when the size of the character string WD in the images is smaller than the predetermined size. In this case, the second recognition unit 514 does not recognize that the target article is picked up even when the size of the character string WD in the images taken by the first camera 56 does not change for the predetermined time.

In contrast, a diagram (2) in FIG. 12 shows when the size of the character string WD in the images is equal to the predetermined size. In this case, the second recognition unit 514 recognizes that the target article is picked up when the size of the character string WD in the images taken by the first camera 56 does not change for the predetermined time.

Then, a method of using a known object recognition technique will be described. For example, the second recognition unit 514 recognizes that the target article is picked up when the size of the character string in the images taken by the first camera 56 does not change for a predetermined time, and at the same time, the second recognition unit 514 recognizes an object "slip" in the images.

Figure 13:
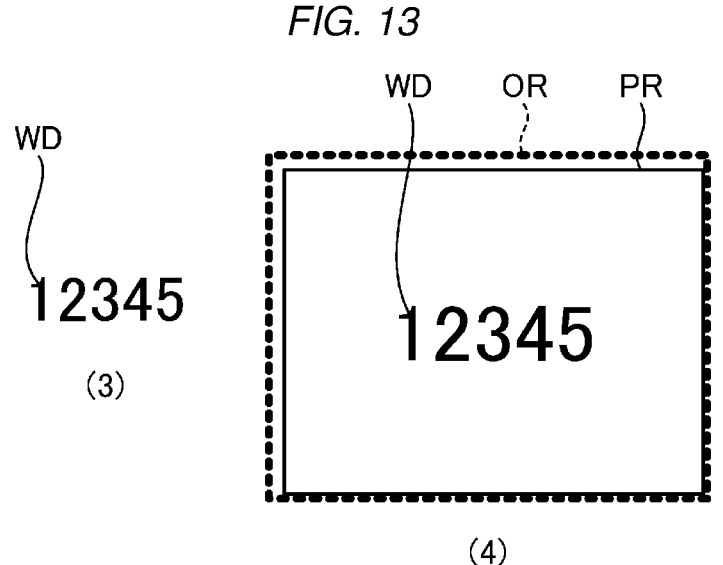
FIG. 13 is a diagram illustrating an example of the processing of recognizing the picking-up.

FIG. 13 is a diagram illustrating an example of the processing of recognizing the fact that the forklift 5 picks up the article. In FIG. 13, a frame OR represents the fact that the slip PR is recognized as an object. Specifically, a diagram (3) in FIG. 13 shows when the object "slip" is not recognized in the images taken by the first camera 56. In this case, the second recognition unit 514 does not recognize that the target article is picked up even when the size of the character string WD in the images taken by the first camera 56 does not change for the predetermined time.

In contrast, a diagram (4) in FIG. 13 shows when the object "slip" is recognized in the images taken by the first camera 56. In this case, the second recognition unit 514 recognizes that the target article is picked up when the size of the character string WD in the images taken by the first camera 56 does not change for the predetermined time.

Then, a method of using a position of the character string in the image will be described. For example, the second recognition unit 514 recognizes that the target article is picked up when the size of the character string in the images taken by the first camera 56 does not change for a predetermined time, and at the same time, the character string is located at a predetermined position.

Figure 14:
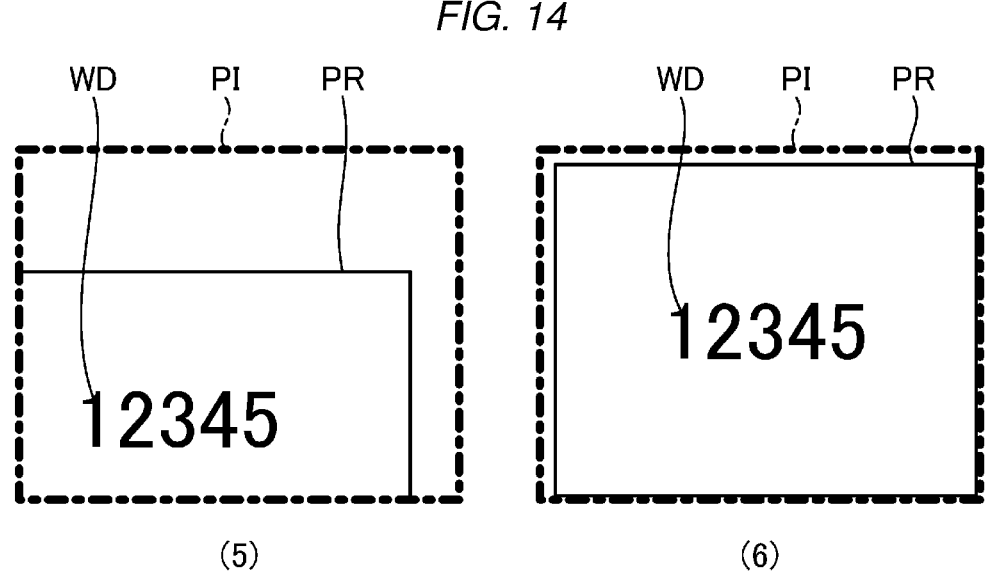
FIG. 14 is a diagram illustrating an example of the processing of recognizing the picking-up.
Figure 15:
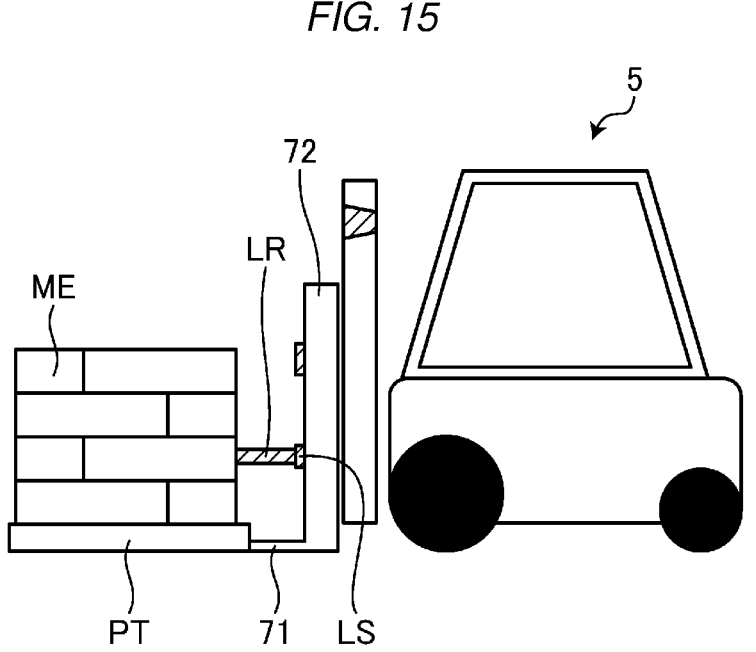
FIG. 15 is a diagram illustrating an example of the processing of recognizing the picking-up.

FIG. 14 is a diagram illustrating an example of the processing of recognizing the fact that the forklift 5 picks up the article ME. In FIG. 14, an image PI represents an image taken by the first camera 56. A diagram (5) in FIG. 14 shows when the position of the character string WD in the image PI is not located at the predetermined position (the center of the image in this example). In this case, the second recognition unit 514 does not recognize that the target article is picked up even when the size of the character string WD in the images taken by the first camera 56 does not change for the predetermined time.

In contrast, a diagram (6) in FIG. 14 shows when the character string WD is located at the predetermined position. In this case, the second recognition unit 514 recognizes that the target article is picked up when the size of the character string WD in the images taken by the first camera 56 does not change for the predetermined time.

Then, a method of using a distance from the forklift 5 will be described. For example, a photosensor LS having a light source and a light receiving unit is provided to the backrest 72 of the forklift 5. The light source of the photosensor LS irradiates the article ME with a laser beam LR. The light receiving unit of the photosensor LS receives a reflected beam of the laser beam LR to detect a distance to the article ME based on the amount of the beam received.

As an example, the second recognition unit 514 recognizes that the target article is picked up when the size of the character string in the images taken by the first camera 56 does not change for a predetermined time, and at the same time, the distance to the article ME detected by the photosensor LS is within a predetermined range.

It should be noted that some of the methods described above may be used alone, or may also be used in combination. Further, when the forklift 5 is equipped with a sensor for detecting the lift of an article, it is possible to reduce the possibility of the erroneous recognition by the second recognition unit 514 using the detection result of that sensor.

Referring back to FIG. 9, the explanation will be continued. The third recognition unit 515 recognizes an action of the forklift 5 unloading the target article. The third recognition unit 515 is one example of a second recognition unit described in the appended claims. For example, the third recognition unit 515 recognizes the fact that the forklift 5 unloads the target article based on the size of the character string obtained by the first recognition unit 513 as the article name of the target article in the image which is taken by the first camera 56 and is then obtained by the first acquisition unit 512. Unloading the target article is an example of a second action.

Figure 16:
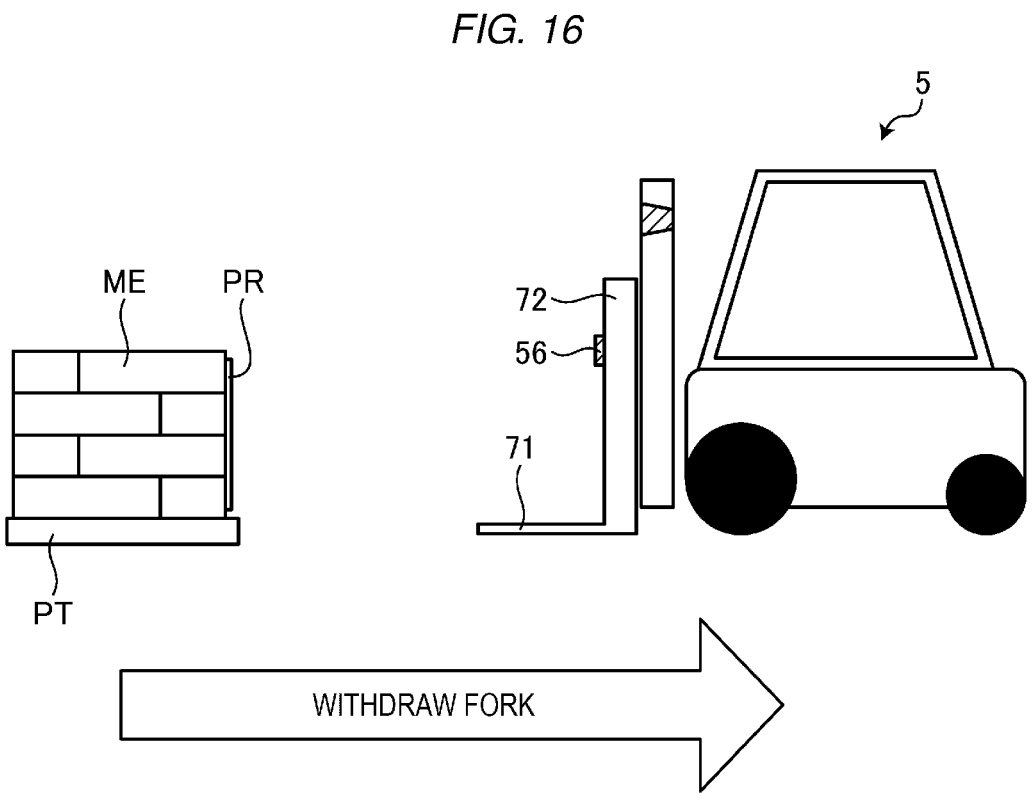
FIG. 16 is a diagram illustrating an example of processing of recognizing unloading of an article from the forklift related to the first embodiment.

Processing of the third recognition unit 515 recognizing the fact that the forklift 5 unloads the target article will hereinafter be described using FIG. 16 and FIG. 17. FIG. 16 is a diagram illustrating an example of the processing of recognizing the fact that the article is unloaded from the forklift 5.

FIG. 16 shows a condition that the forklift 5 moves down the fork 71 for unloading the article ME, and then gets away from the article ME for withdrawing the fork 71 from the pallet PT. In FIG. 16, the article ME is mounted on the pallet PT, and the slip PR on which the character string representing the article name of that article ME is described is attached to the article ME.

The forklift 5 moves down the fork 71, and then moves backward to withdraw the fork 71 from the pallet PT to thereby unload the article ME from the forklift 5. On this occasion, the size of the character string described on the slip PR in the images taken by the first camera 56 disposed on the backrest 72 of the forklift 5 decreases as the forklift 5 gets away to the article ME.

From this, the third recognition unit 515 makes it a rule to recognize the fact that the forklift 5 unloads the target article when a reduction ratio of the size of the character string with reference to the size of the character string at a moment when the size of the character string starts decreasing exceeds a predetermined percentage. Here, FIG. 17 is a diagram illustrating an example of the processing of recognizing the fact that the article is unloaded from the forklift 5. FIG. 17 shows a time-series change in size of the character string WD described on the slip PR in the images taken by the first camera 56.

Figure 17:
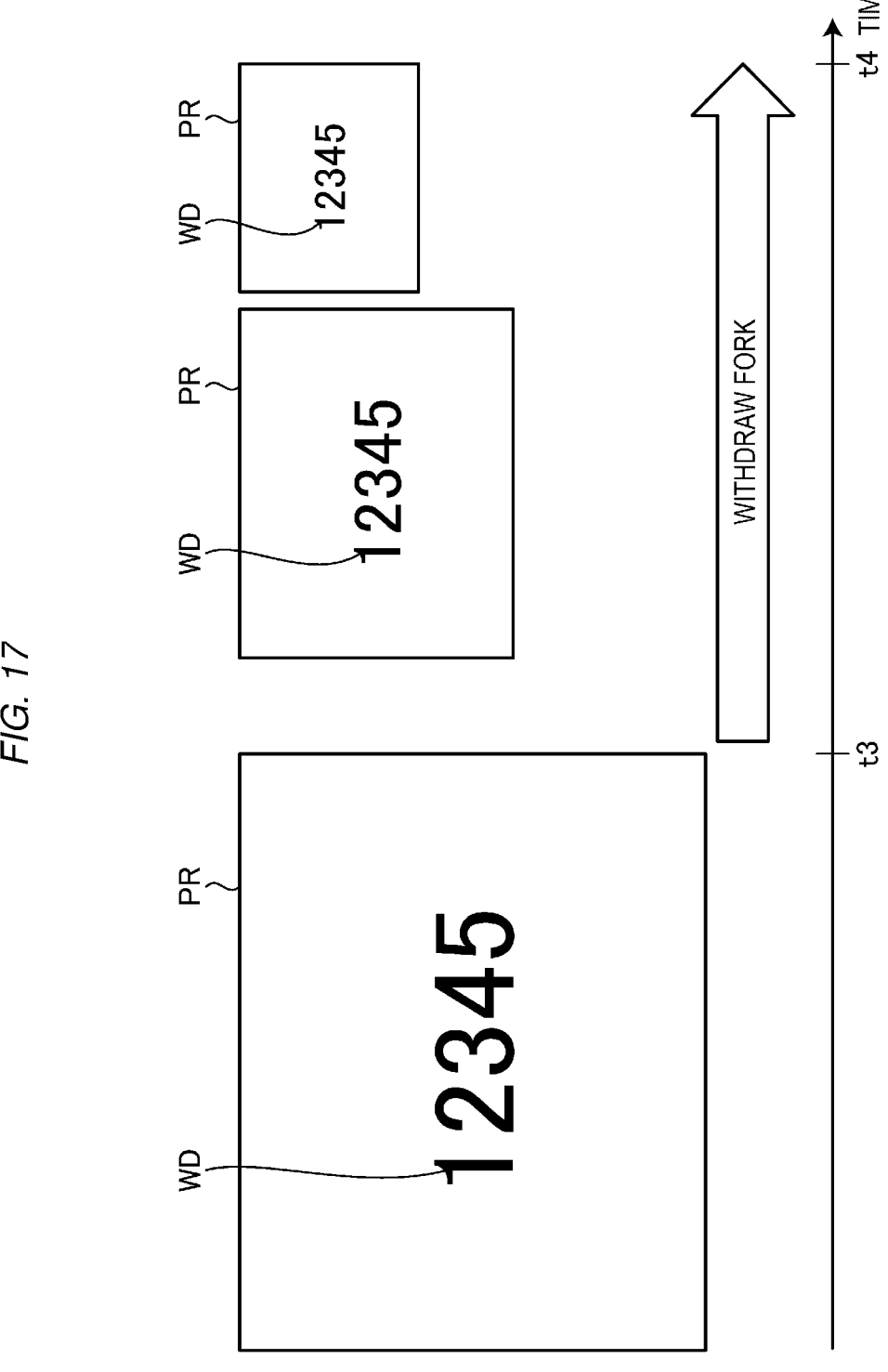
FIG. 17 is a diagram illustrating an example of the processing of recognizing the unloading.

The horizontal axis of FIG. 17 represents time. In FIG. 17, it is assumed that the forklift 5 moves down the fork 71 and then starts getting away from the article ME for withdrawing the fork 71 from the pallet PT loaded with the article ME at time t3 in accordance with an operation of the worker.

Before the time t3, a state in which the fork 71 is inserted in the pallet PT is kept. Therefore, as shown in FIG. 17, the size of the character string WD described on the slip PR in the images taken by the first camera 56 does not change before the time t3 passes.

In contrast, after the time t3, the forklift 5 gets away from the article ME in order to withdraw the fork 71 from the pallet PT. Therefore, as shown in FIG. 17, the size of the character string WD described on the slip PR in the images taken by the first camera 56 decreases at and after the time t3 as a result.

As an example, the third recognition unit 515 recognizes the time (the time t3 in FIG. 17) at which the size of the character string WD described on the slip PR starts decreasing based on the images which are taken by the first camera 56, and which are obtained in real time. Then, the third recognition unit 515 recognizes that the target article is unloaded when the third recognition unit 515 recognizes that the reduction ratio of the size of the character string WD described on the slip PR with reference to the size of the character string WD at that time exceeds the predetermined percentage (when it is recognized that time t4 passes in FIG. 17).

It should be noted that the second recognition unit 514 and the third recognition unit 515 are assumed to be separate functional units in the present embodiment, but may be configured as a single functional unit by integrating the function of the second recognition unit 514 and the function of the third recognition unit 515 with each other.

Referring back to FIG. 9, the explanation will be continued. The second acquisition unit 516 obtains location information of the article when an action of the forklift 5 is recognized. For example, the second acquisition unit 516 obtains the location information representing the location of the target article based on the location of the forklift 5 when the target article is unloaded.

As an example, the second acquisition unit 516 obtains the location when the third recognition unit 515 recognizes that the article is unloaded based on a location recognizing two-dimensional code included in the image which is taken by the second camera 57, and is then obtained by the first acquisition unit 512. The two-dimensional code is an example of a code symbol. Acquisition processing of the location will hereinafter be described using FIG. 18.

Figure 18:
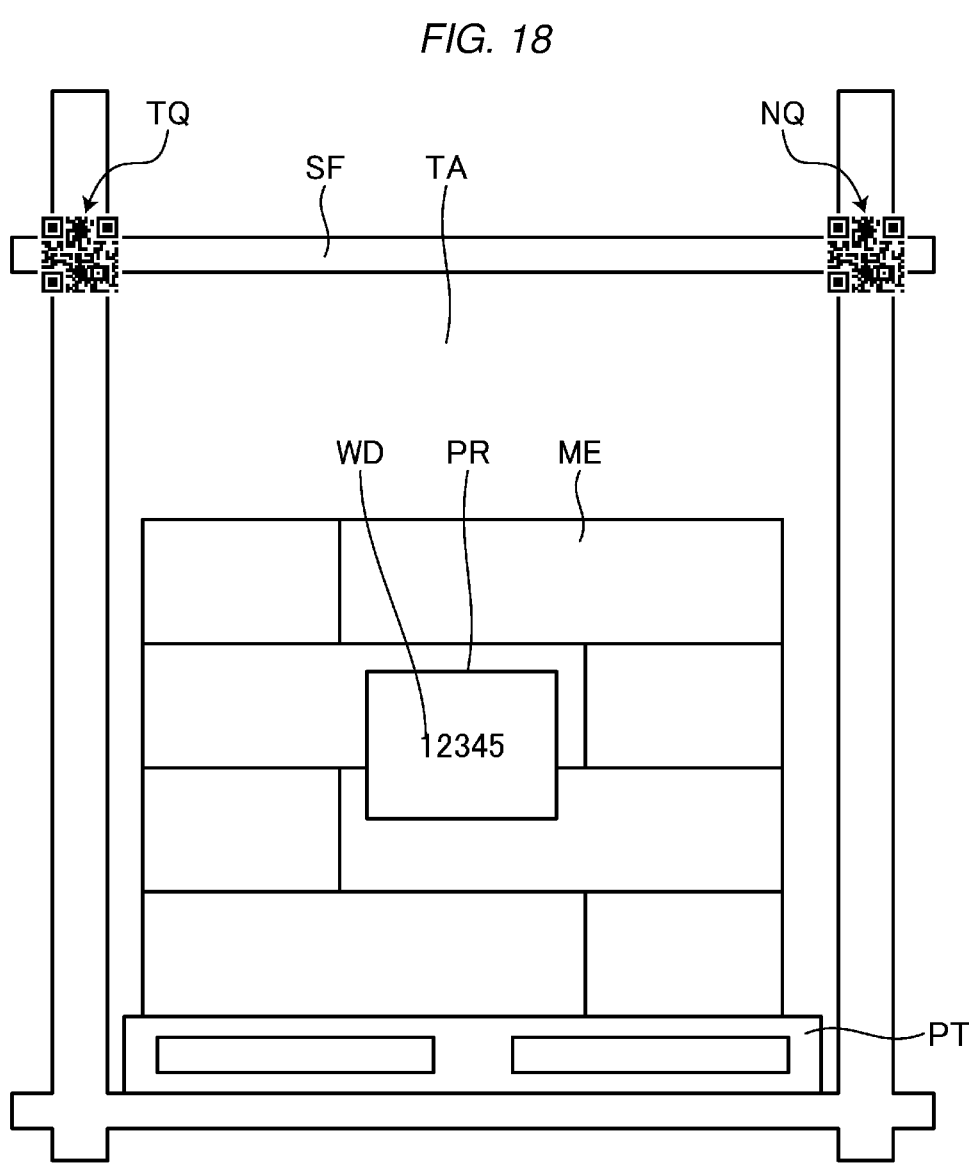
FIG. 18 is a diagram illustrating an example of processing of acquisition of a location related to the first embodiment.

FIG. 18 is a diagram illustrating an example of the acquisition processing of the location. In FIG. 18, an area TA for storing the article is formed of a shelf SF. Further, the article ME is disposed in the area TA, and the slip PR describing "12345" as the character string WD is attached to the front surface of the article ME.

Further, a two-dimensional code TQ obtained by coding the location of the area TA is disposed at upper left of the area TA. Further, a two-dimensional code NO obtained by coding a location of a storage area as a right-hand neighbor of the area TA is disposed at upper right of the area TA. It should be noted that barcodes may be used instead of the two-dimensional codes.

For example, the second acquisition unit 516 reads the two-dimensional code located in an upper left region on the image which is taken by the second camera 57 and is then obtained by the first acquisition unit 512 in real time when the third recognition unit 515 recognizes that the target article is unloaded based on the size of the character string WD described on the slip PR. As an example, in FIG. 18, the second acquisition unit 516 reads the two-dimensional code TQ to obtain the location corresponding to that two-dimensional code.

The location where the target article is unloaded, namely the location representing the location of the target article, obtained in such a manner as described above is transmitted to the server device 1 by the communication control unit 511 together with the article name obtained by the first recognition unit 513 as the name of the target article. The communication control unit 511 in this case is an example of an output unit. The location and the article name received by the communication control unit 411 of the server 1 are associated with each other and are then stored as the management information 441 by the storage control unit 412.

It should be noted that the second acquisition unit 516 may continuously perform acquisition of the location during movement of the forklift 5.

As an example, when the two-dimensional code is included in the image taken by the second camera 57, the second acquisition unit 516 reads that two-dimensional code irrespective of whether the target article is unloaded. Further, when there are two or more two-dimensional codes on the image taken by the second camera 57, the second acquisition unit 516 is assumed to read one located closer to the left side on the image in priority. Thus, it is possible to always figure out the current location of the forklift 5.

It should be noted that a program which makes the camera device 2 execute the processing for realizing such functions as described above can be provided as a file in a installable format or an executable format recorded on a computer-readable recording medium such as a CD-ROM, an FD, a CD-R, or a DVD. Further, the program may be provided or delivered via a network such as the Internet.

Referring back to FIG. 1, the explanation will be continued. The worker terminal 3 is a device for assisting the operation of the worker who performs the operation in the warehouse managed by the server device 1. A configuration of the worker terminal 3 will hereinafter be described using FIG. 19 and FIG. 20.

Figure 19:
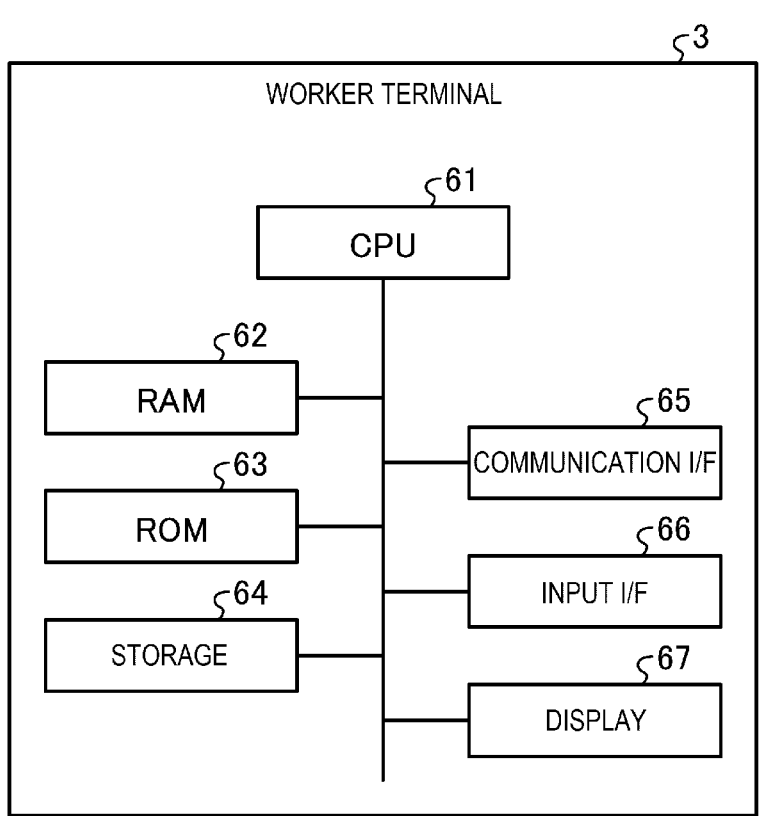
FIG. 19 is a block diagram showing an example of a hardware configuration of a worker terminal related to the first embodiment.

First, a hardware configuration of the worker terminal 3 will be described. FIG. 19 is a block diagram showing an example of the hardware configuration of the worker terminal 3 related to the first embodiment. The worker terminal 3 is provided with a CPU 61, a RAM 62, a ROM 63, a storage 64, a communication I/F 65, an input I/F 66, and the display 67. These units 61 through 67 are coupled to each other via a data bus.

The CPU 61 performs overall control of the worker terminal 3. For example, the CPU 61 uses the RAM 62 as a work area, and executes a program stored in the ROM 63, the storage 64, and so on to thereby execute a variety of types of processing. The storage 64 is a nonvolatile memory to which data can be written, and to which data can be rewritten.

The communication I/F 65 is a device for establishing communication of a predetermined type with the server device 1 and the camera device 2. The input I/F 66 is a device which makes it possible to receive input from the worker. As the input I/F 66, there can be cited, for example, a touch panel. The display 67 is a display device for displaying a variety of types of information. For example, the display 67 displays the article list display screen, the article search screen, and so on generated by the server device 1.

Figure 20:
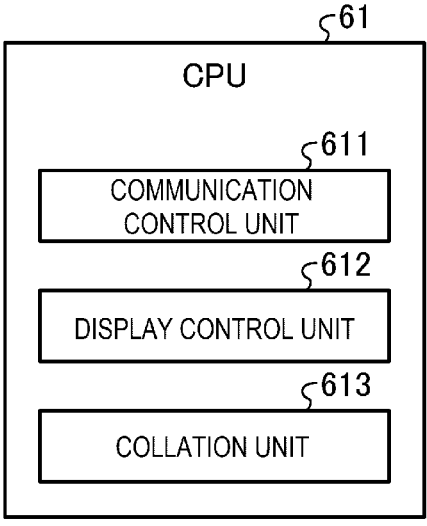
FIG. 20 is a block diagram showing an example of a functional configuration of the worker terminal.

Then a functional configuration of the worker terminal 3 will be described. FIG. 20 is a block diagram showing an example of the functional configuration of the worker terminal 3 related to the first embodiment. In the present embodiment, the CPU 61 of the worker terminal 3 executes a program stored in the storage 64 or the like to thereby realize a variety of functions of the worker terminal 3. The CPU 61 has a communication control unit 611, a display control unit 612, and a collation unit 613.

The communication control unit 611 controls transmission and reception of information with the server device 1 and the camera device 2. For example, the communication control unit 611 receives a variety of instructions such as the reception instruction of an article, the shipping instruction of an article, and the transfer instruction of an article from the server device 1 via the communication I/F 65. Further, for example, the communication control unit 611 receives a variety of notices such as the notice that an article is picked up and the notice that an article is unloaded from the camera device 2 in substantially the same manner.

Further, for example, the communication control unit 611 transmits a collation completion notice to the camera device 2 when the collation of the article name of the article the shipping or the transfer of which is instructed with the article name advised from the camera device 2 is completed in substantially the same manner.

The display control unit 612 performs control of making the display device display the variety of types of information. For example, the display control unit 612 performs control of making the display 67 display the article list display screen, the article search screen, and so on generated by the server device 1.

Further, the display control unit 612 performs control of making the display 67 display a message that the article is picked up when the display control unit 612 receives the notice that the article is picked up from the camera device 2. Further, the display control unit 612 performs control of making the display 67 display a message that the article is unloaded when the display control unit 612 receives the notice that the article is unloaded from the camera device 2.

The collation unit 613 performs the collation of the article name the shipping or the transfer of which is instructed by the server device 1 with the article name of the article which is recognized to be picked up by the camera device 2. For example, when the collation unit 613 receives the notice that the article is picked up from the camera device 2, the collation unit 613 collates the article name included in that notice with the name of the article the shipping or the transfer of which is instructed by the server device 1.

As a result of the collation, when the article names do not match each other, the collation unit 613 may make the display 67 display a warning message that there is a possibility that an article different from the article the shipping or the transfer of which is instructed is picked up in cooperation with the display control unit 612.

It should be noted that a program which makes the worker terminal 3 execute the processing for realizing such functions as described above can be provided as a file in a installable format or an executable format recorded on a computer-readable recording medium such as a CD-ROM, an FD, a CD-R, or a DVD. Further, the program may be provided or delivered via a network such as the Internet.

Figure 21:
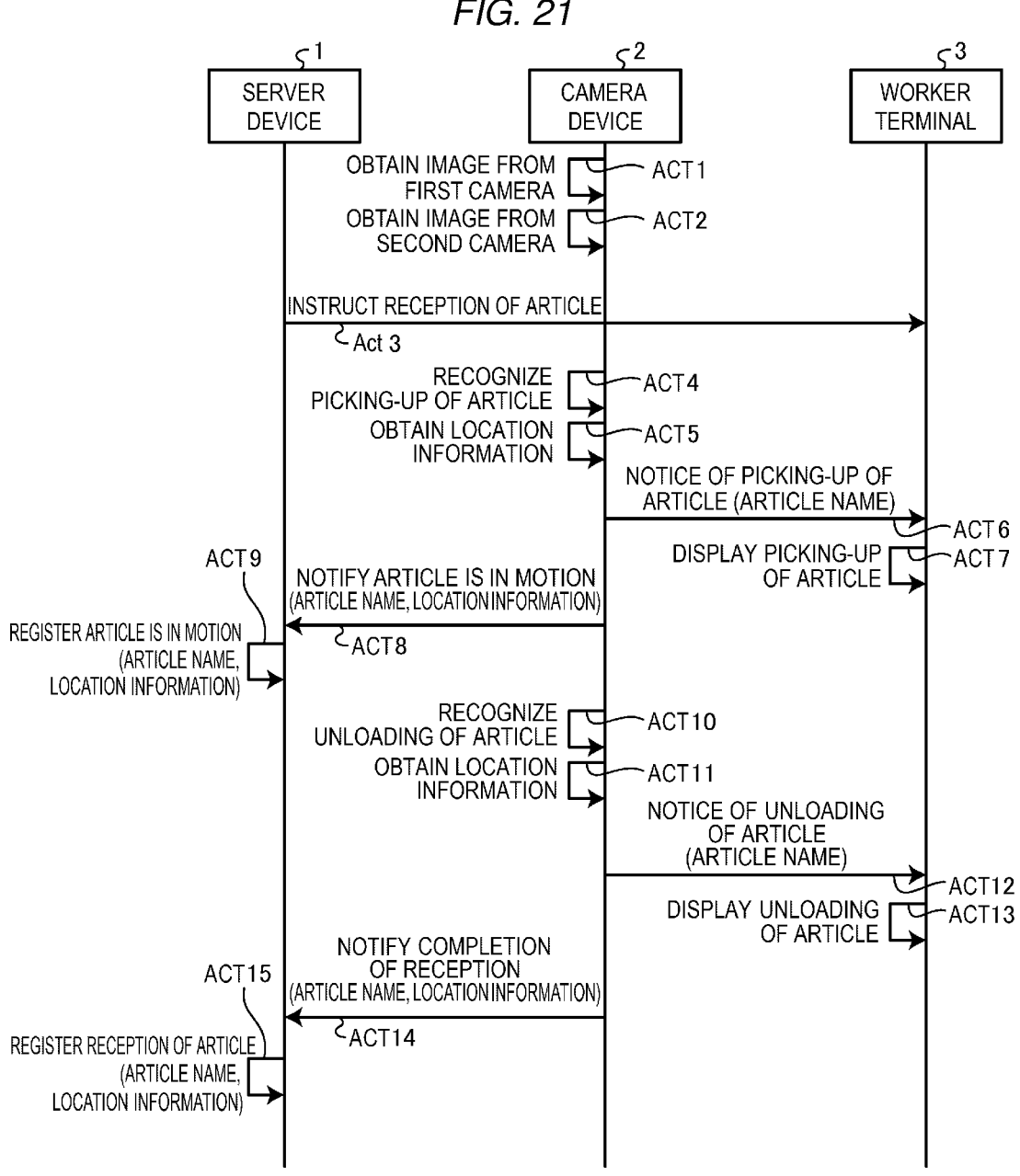
FIG. 21 is a sequence diagram showing an example of processing to be executed by the information processing system.

Then, processing to be executed by the information processing system S will be described. First, the reception processing of an article will be described. FIG. 21 is a sequence diagram showing an example of the processing to be executed by the information processing system S according to the first embodiment. FIG. 21 shows an example of processing when the worker performs the reception processing.

The first acquisition unit 512 of the camera device 2 obtains (ACT1) the images taken by the first camera 56. Further, the first acquisition unit 512 obtains (ACT2) the images taken by the second camera 57. It should be noted that in FIG. 21, the processing of obtaining the images taken by the first camera is described as ACT1, and the processing of obtaining the images taken by the second camera 57 is described as ACT2, but it is assumed that the processing in ACT1 and the processing in ACT2 are continuously executed.

Further, the communication control unit 411 of the server device 1 transmits (ACT3) the reception instruction of an article to the worker terminal 3. For example, the communication control unit 411 transmits the reception instruction of an article to the worker terminal 3 via the communication I/F 45. The communication control unit 611 of the worker terminal 3 receives the reception instruction of an article via the communication I/F 65.

The worker operates the forklift 5 to move the forklift 5 to the arrival berth in accordance with the reception instruction of the article. Further, the worker operates the forklift 5 to perform processing of inserting the fork 71 into the pallet PT which is loaded with the article disposed in the arrival berth.

The second recognition unit 514 of the camera device 2 recognizes (ACT4) that the article is picked up based on the images which are taken by the first camera 56 and are obtained in ACT1. For example, the first recognition unit 513 recognizes the character string WD which represents the article name of the article and is described on the slip PR attached to the front surface of the article, and obtains that character string WD as the article name of the article as the reception target.

Further, the second recognition unit 514 recognizes that the article is picked up when the predetermined time elapses after the size of the character string WD in the images taken by the first camera 56 stops changing.

Then, the second acquisition unit 516 obtains (ACT5) the location information of the article when it is recognized that the article is picked up. For example, the second acquisition unit 516 reads the two-dimensional code included in the image taken by the second camera 57 when the second recognition unit 514 recognizes that the article is picked up in ACT4. The second acquisition unit 516 obtains the location corresponding to that two-dimensional code as the location representing the current location of the article.

Further, the communication control unit 511 transmits (ACT6) the notice that it is recognized that the article is picked up to the worker terminal 3. For example, when the second recognition unit 514 recognizes that the article is picked up in ACT4, the communication control unit 511 transmits the notice that it is recognized that the article is picked up to the worker terminal 3 via the communication I/F 55. That notice includes the article name of the article as the reception target obtained by the first recognition unit 513.

It should be noted that the processing in ACT6 is described in FIG. 21 as the processing after ACT5, but the processing in ACT6 may be executed in parallel to the processing in ACT5, or may be executed after ACT4 and before the processing in ACT5 is executed.

The communication control unit 611 of the worker terminal 3 receives the notice that it is recognized that the article is picked up from the camera device 2. Then, the display control unit 612 makes the display 67 display (ACT7) that the article is picked up.

For example, the display control unit 612 makes the display 67 display the article name of the article as the reception target and the fact that the article is picked up both of which are included in the notice. Thus, the worker can figure out that the forklift 5 is ready to move. Subsequently, the worker operates the forklift 5 to perform the processing of conveying the article.

Further, the communication control unit 511 of the camera device 2 transmits (ACT8) the notice that the article as the reception target is in motion to the server device 1. For example, the communication control unit 511 transmits the notice that the article as the reception target is in motion to the server device 1 via the communication I/F 55. That notice includes the article name and the location of the article as the reception target.

The communication control unit 411 of the server device 1 receives the notice that the article as the reception target is in motion. Then, the storage control unit 412 registers (ACT9) that the article as the reception target is in motion. For example, the storage control unit 412 stores the article name and the location included in the notice that the article as the reception target is in motion in the management information 441 in association with each other, and further added with a status of in-motion.

Further, the worker searches for a vacant area in the warehouse while moving the forklift 5. Then, when the worker finds out a vacant area, the worker operates the forklift 5 to move down the fork 71. Subsequently, the worker operates the forklift 5 to perform the processing of withdrawing the fork 71 from the pallet PT.

It should be noted that the worker visually searches the vacant area in the warehouse in this example, but it is possible for the server device 1 to designate a storage location of the article as the reception target. As an example, the server device 1 refers to the management information 441 to specify areas where no articles are stored, and then designates one of those areas as the storage location. In this case, the communication control unit 411 transmits information of the storage location to the worker terminal 3 together with the reception instruction of the article.

Subsequently, the second recognition unit 514 of the camera device 2 recognizes (ACT10) that the article is unloaded based on the images which are taken by the first camera 56 and are obtained in ACT1. For example, the second recognition unit 514 recognizes that the article is unloaded when the reduction ratio of the size of the character string WD in the images taken by the first camera 56 exceeds the predetermined percentage.

Then, the second acquisition unit 516 obtains (ACT11) the location information of the article when it is recognized that the article is unloaded. For example, the second acquisition unit 516 reads the two-dimensional code included in the image taken by the second camera 57 when the second recognition unit 514 recognizes that the article is unloaded in ACT11. The second acquisition unit 516 obtains the location corresponding to that two-dimensional code as the location representing the current location of the article.

Further, the communication control unit 511 transmits (ACT12) the notice that it is recognized that the article is unloaded to the worker terminal 3. For example, when the second recognition unit 514 recognizes that the article is unloaded in ACT11, the communication control unit 511 transmits the notice that it is recognized that the article is unloaded to the worker terminal 3 via the communication I/F 55. That notice includes the article name of the article as the reception target obtained by the first recognition unit 513.

It should be noted that the processing in ACT12 is described in FIG. 21 as the processing after ACT11, but the processing in ACT12 may be executed in parallel to the processing in ACT11, or may be executed after ACT10 and before the processing in ACT11 is executed.

The communication control unit 611 of the worker terminal 3 receives the notice that it is recognized that the article is unloaded from the camera device 2. Then, the display control unit 612 makes the display 67 display (ACT13) that the article is unloaded.

For example, the display control unit 612 makes the display 67 display the article name of the article as the reception target and the fact that the article is unloaded both of which are included in the notice. Thus, it is possible for the worker to figure out the fact that the reception processing of the article is completed.

Further, the communication control unit 511 of the camera device 2 transmits (ACT14) a reception completion notice representing the completion of the reception of the article to the server device 1. For example, the communication control unit 511 transmits the reception completion notice to the server device 1 via the communication I/F 55. That notice includes the article name and the location of the article as the reception target.

The communication control unit 411 of the server device 1 receives the reception completion notice. Subsequently, the storage control unit 412 registers (ACT15) the reception of the article to terminate the present processing. For example, the storage control unit 412 stores the article name and the location included in the reception completion notice in the management information 441 in association with each other, after deleting the status of in-motion.

Figure 22:
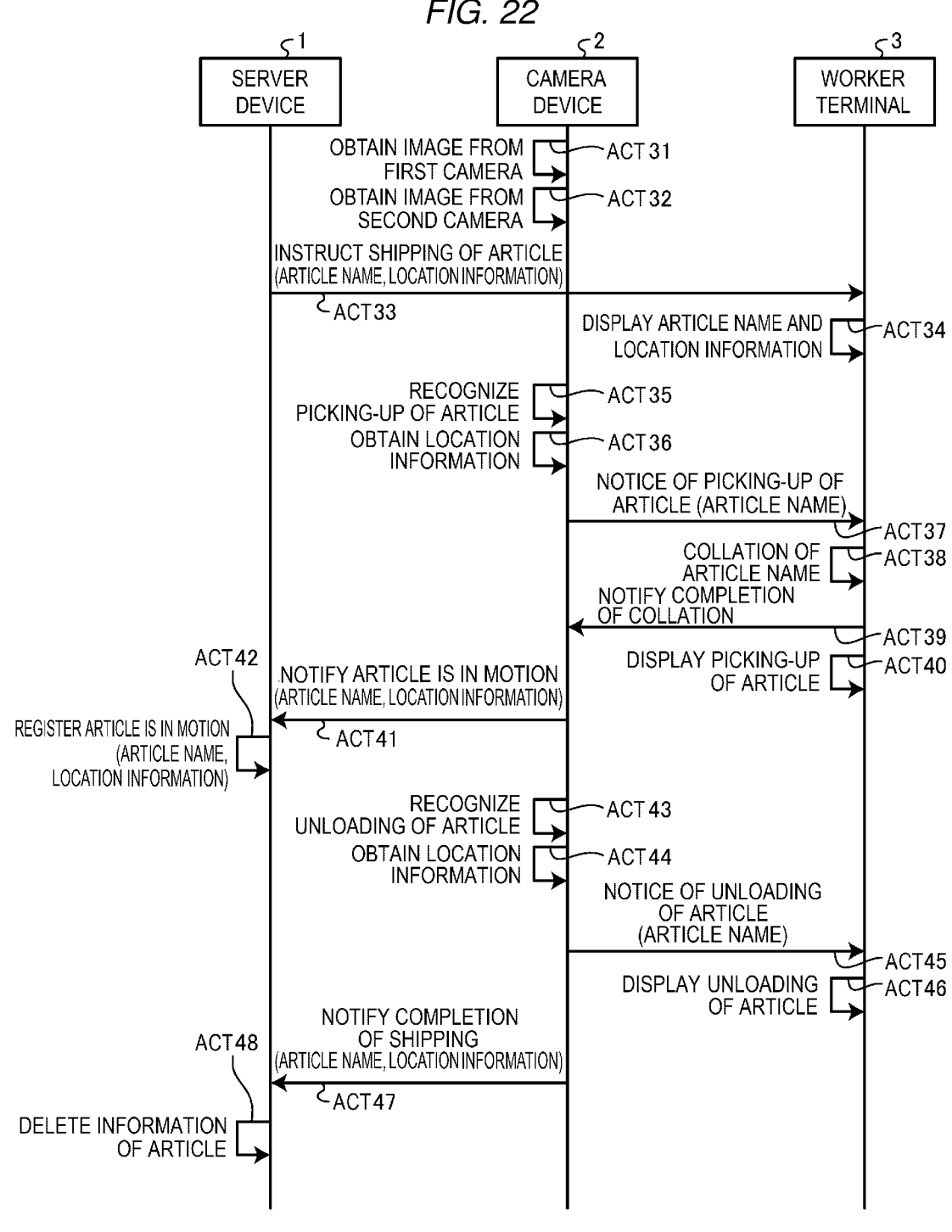
FIG. 22 is a sequence diagram showing an example of the processing to be executed by the information processing system.

Then, the shipping processing of an article will be described. FIG. 22 is a sequence diagram showing an example of the processing to be executed by the information processing system S according to the first embodiment. FIG. 22 shows an example of processing when the worker performs the shipping processing. ACT31 and ACT32 are substantially the same as ACT1 and ACT2 in FIG. 21, and therefore, the description thereof will be omitted.

The communication control unit 411 of the server device 1 transmits (ACT33) the shipping instruction of an article to the worker terminal 3. For example, the communication control unit 411 transmits the shipping instruction of an article to the worker terminal 3 via the communication I/F 45. The shipping instruction of an article includes the article name of the article to be shipped, and the location where the article is stored. The communication control unit 611 of the worker terminal 3 receives the shipping instruction of the article via the communication I/F 65.

Then, the display control unit 612 makes the display 67 display (ACT34) the article name and the location information related to the shipping instruction of the article. For example, the display control unit 612 makes the display 67 display the article name of the article to be shipped and the location where the article is stored both of which are included in the shipping instruction of the article. Thus, it becomes easy for the worker to figure out the information related to the article as the shipping target.

The worker operates the forklift 5 to move the forklift 5 to the location displayed on the display in ACT34 in accordance with the shipping instruction of the article. Further, the worker operates the forklift 5 to perform processing of inserting the fork 71 into the pallet PT loaded with the article stored at that location.

ACT35 through ACT37 are substantially the same as ACT4 through ACT6 in FIG. 21, and therefore, the description thereof will be omitted. After ACT37, the collation unit 613 collates (ACT38) the article name of the article related to the shipping instruction with the article name related to the notice that the article is picked up. For example, the collation unit 613 collates the article name included in the shipping instruction of the article transmitted from the server device 1 with the article name included in the notice that the article is picked up.

Although not shown in the drawing, as a result of the collation, when the article names do not match each other, the collation unit 613 may make the display 67 display a message notifying the worker of warning that there is a possibility that an article different from the article related to the shipping instruction is picked up in cooperation with the display control unit 612. Thus, it is possible to prevent a wrong article from being conveyed to the shipping berth.

When the article names match each other as a result of the collation, the communication control unit 611 transmits (ACT39) a collation completion notice to the camera device 2 via the communication I/F 65. The communication control unit 511 of the camera device 2 receives the collation completion notice via the communication I/F 55. ACT40 through ACT46 are substantially the same as ACT7 through ACT13 in FIG. 21, and therefore, the description thereof will be omitted.

When performing the shipping processing, by the display control unit 612 making the display 67 display the fact that the article is unloaded, it is possible for the worker to figure out the fact that the article related to the shipping is unloaded in the shipping berth.

The communication control unit 511 of the camera device 2 transmits (ACT47) a shipping completion notice representing the completion of the shipping of the article to the server device 1. For example, the communication control unit 511 transmits the shipping completion notice to the server device 1 via the communication I/F 55. That notice includes the article name of the article as the shipping target and the location representing the shipping berth.

The communication control unit 411 of the server device 1 receives the shipping completion notice. Subsequently, the storage control unit 412 deletes (ACT48) the information of the article related to the shipping from the management information 441 to terminate the present processing. For example, the storage control unit 412 deletes the information of the article corresponding to the shipping instruction transmitted in ACT33 from the management information 441.

Figure 23:
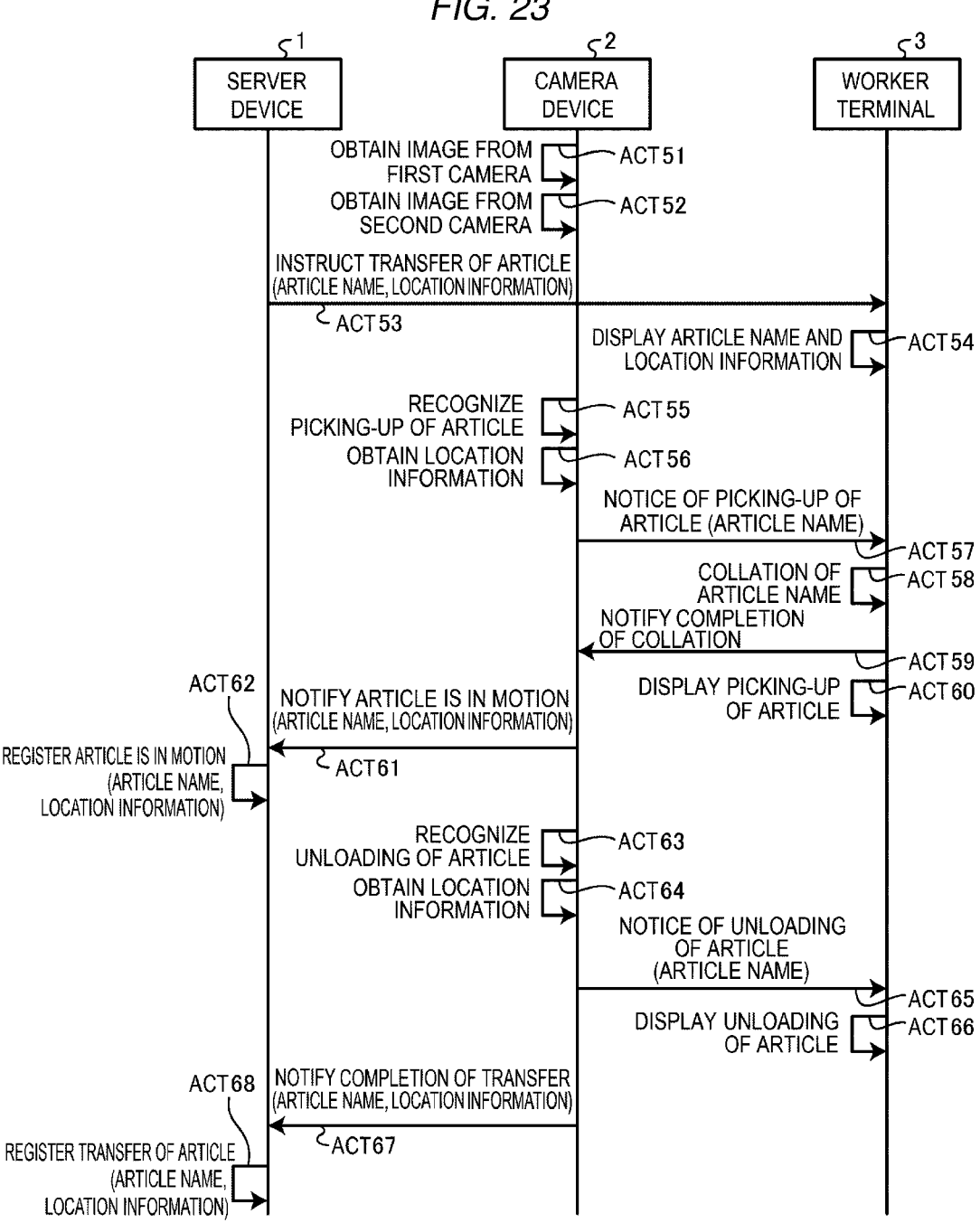
FIG. 23 is a sequence diagram showing an example of the processing to be executed by the information processing system.

Then, the transfer processing of an article will be described. FIG. 23 is a sequence diagram showing an example of processing to be executed by the information processing system S according to the first embodiment. FIG. 23 shows an example of processing when the worker performs the transfer processing. ACT51 and ACT52 are substantially the same as ACT31 and ACT32 in FIG. 22, and therefore, the description thereof will be omitted.

The communication control unit 411 of the server device 1 transmits (ACT53) the transfer instruction of an article to the worker terminal 3. For example, the communication control unit 411 transmits the transfer instruction of an article to the worker terminal 3 via the communication I/F 45. The transfer instruction of an article includes the article name of the article to be transferred, the location where the article is stored, and a location representing a transfer destination. The communication control unit 611 of the worker terminal 3 receives the transfer instruction of the article via the communication I/F 65.

Then, the display control unit 612 makes the display 67 display (ACT54) the article name related to the transfer instruction of the article, the current location information of that article, and the location information of the transfer destination. For example, the display control unit 612 makes the display 67 display the article name of the article to be transferred, the location where that article is stored, and the location representing the transfer destination all of which are included in the transfer instruction of the article. Thus, it becomes easy for the worker to figure out the information related to the article as the transfer target.

The worker operates the forklift 5 to move the forklift 5 to the location representing the current position of the article related to the transfer displayed on the display in ACT54 in accordance with the transfer instruction of the article. Further, the worker operates the forklift 5 to perform processing of inserting the fork 71 into the pallet PT loaded with the article stored at that location.

ACT55 through ACT66 are substantially the same as ACT35 through ACT46 in FIG. 22, and therefore, the description thereof will be omitted. When performing the transfer processing, by the display control unit 612 making the display 67 display the fact that the article is unloaded, it is possible for the worker to figure out the fact that the article related to the transfer is unloaded in the area as the transfer destination.

The communication control unit 511 of the camera device 2 transmits (ACT67) a transfer completion notice representing the completion of the transfer of the article to the server device 1. For example, the communication control unit 511 transmits the transfer completion notice to the server device 1 via the communication I/F 55. That notice includes the article name of the article as the transfer target and the location representing the transfer destination.

The communication control unit 411 of the server device 1 receives the transfer completion notice. Subsequently, the storage control unit 412 registers (ACT68) the transfer of the article to terminate the present processing. For example, the storage control unit 412 stores the article name and the location included in the transfer completion notice in the management information 441 in association with each other, after deleting the status of in-motion.

As described hereinabove, the camera device 2 related to the present embodiment recognizes the symbol such as the character string representing the name of the article based on the images taken by the camera, and recognizes picking-up of the article and unloading of the article based on the change in size of the symbol in the images. Further, the camera device 2 obtains the location information representing the location where the article is unloaded, and outputs the name and the location information of the article in association with each other.

Thus, it is possible for the camera device 2 related to the present embodiment to automatically recognize that the article is picked up and that the article is unloaded only by taking the images with the camera. Further, it is possible for the camera device 2 related to the present embodiment to recognize that the article is transferred only by recognizing that the article is picked up. Further, it is possible for the camera device 2 related to the present embodiment to recognize that the article is set down by recognizing that the article is unloaded, and obtaining the location information representing the location where the article is unloaded. Incidentally, when arranging articles in a free-location manner, it can be said that it is an important issue to figure out that an article is transferred and that an article is placed in order to correctly manage the articles. Since the camera device 2 related to the present embodiment can automatically recognize that an article is picked up and that the article is unloaded, it is possible for the worker to figure out the fact that the article is picked up and that the article is placed without determining that the article is picked up and that the article is unloaded by him- or herself. In other words, according to the present embodiment, it is possible to enhance the convenience of the article management in the warehouse where the articles are arranged in a free-location manner.

Second Embodiment

In the first embodiment described above, the aspect in which the worker operates the forklift 5 to perform the reception and the shipping is described. In a second embodiment, an aspect in which an unmanned forklift performs the reception and the shipping will be described.

It should be noted that hereinafter issues different from those of the embodiment described above will mainly be described, and regarding issues common to the contents already described, the detailed description will be omitted.

Further, the embodiments described hereinafter may individually be implemented, or may be implemented in combination as appropriate.

Figures 24, 25:
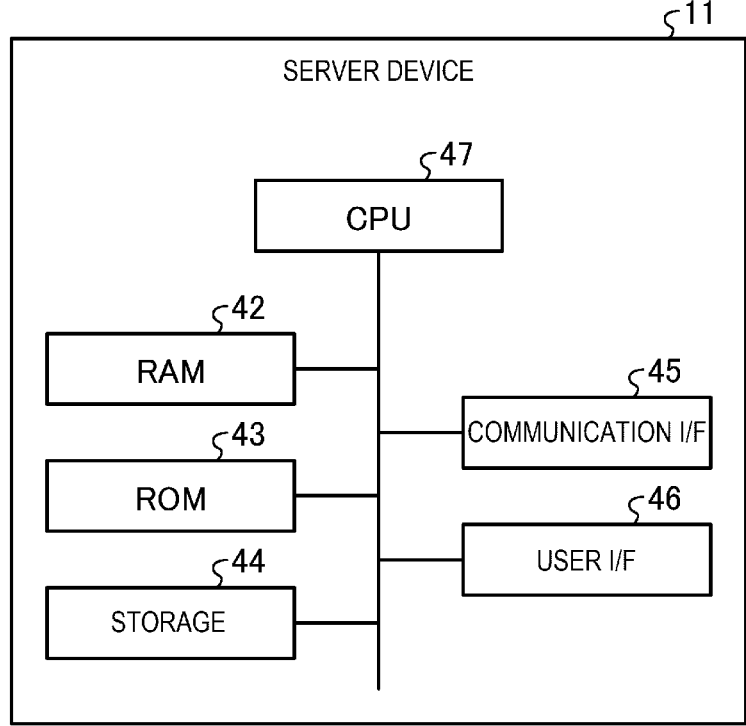
FIG. 24 is a block diagram showing an example of a configuration of an information processing system according to a second embodiment.
FIG. 25 is a block diagram showing an example of a hardware configuration of a server device related to the second embodiment.

FIG. 24 is a diagram showing an example of an overall configuration of an information processing system Sa according to the second embodiment. The information processing system Sa is provided with a server device 11, a camera device 21, and a drive control device. The server device 11, the camera device 21, and the drive control device 4 are coupled to each other so as to be able to communicate with each other with the network N. A configuration of the server device 11 will hereinafter be described using FIG. 25 and FIG. 26.

First, a hardware configuration of the server device 11 will be described. FIG. 25 is a block diagram showing an example of the hardware configuration of the server device 11 related to the second embodiment. The server device 11 is substantially the same in configuration as the server device 1 shown in FIG. 2, but is different from the server device 1 shown in FIG. 2 in that a CPU 47 is provided instead of the CPU 41.

Figure 26:
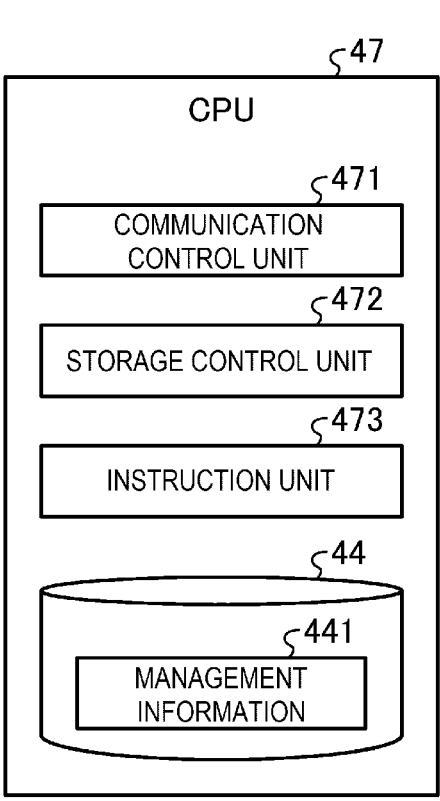
FIG. 26 is a block diagram showing an example of a functional configuration of the server device.

Then, a functional configuration of the server device 11 will be described. FIG. 26 is a block diagram showing an example of the functional configuration of the server device 11 related to the second embodiment. In the present embodiment, the CPU 47 of the server device 11 executes a program stored in the storage 44 or the like to thereby realize a variety of functions of the server device 11.

The CPU 47 related to the present embodiment has a communication control unit 471, a storage control unit 472, and an instruction unit 473. Further, the storage 44 has the management information 441. The storage control unit 472 and the instruction unit 473 are substantially the same as the storage control unit 412 and the instruction unit 413, and therefore, the description thereof will be omitted.

The communication control unit 471 controls transmission and reception of information with the camera device 21. For example, the communication control unit 471 transmits the reception instruction of an article, the shipping instruction of an article, the transfer instruction of an article, and so on to the camera device 21 via the communication I/F 45. Further, for example, the communication control unit 471 receives a variety of notices such as the notice that an article is in motion, the notice that reception of an article is completed, and the notice that shipping of an article is completed from the camera device 21 in substantially the same manner.

Figure 27:
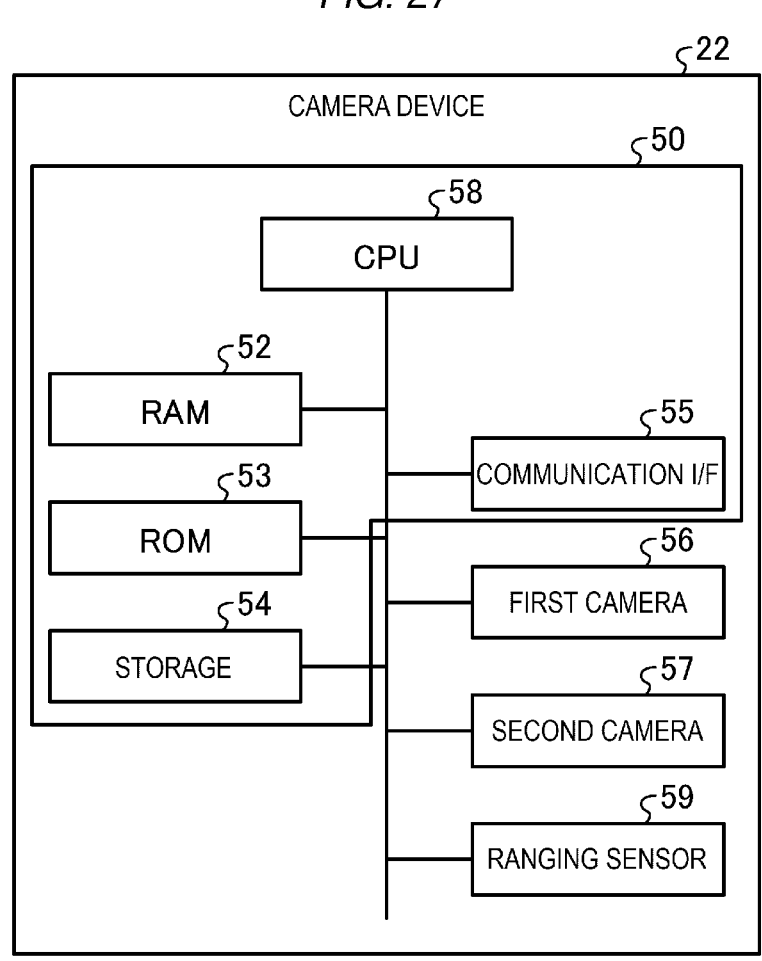
FIG. 27 is a block diagram showing an example of a hardware configuration of a camera device related to the second embodiment.
Figure 28:
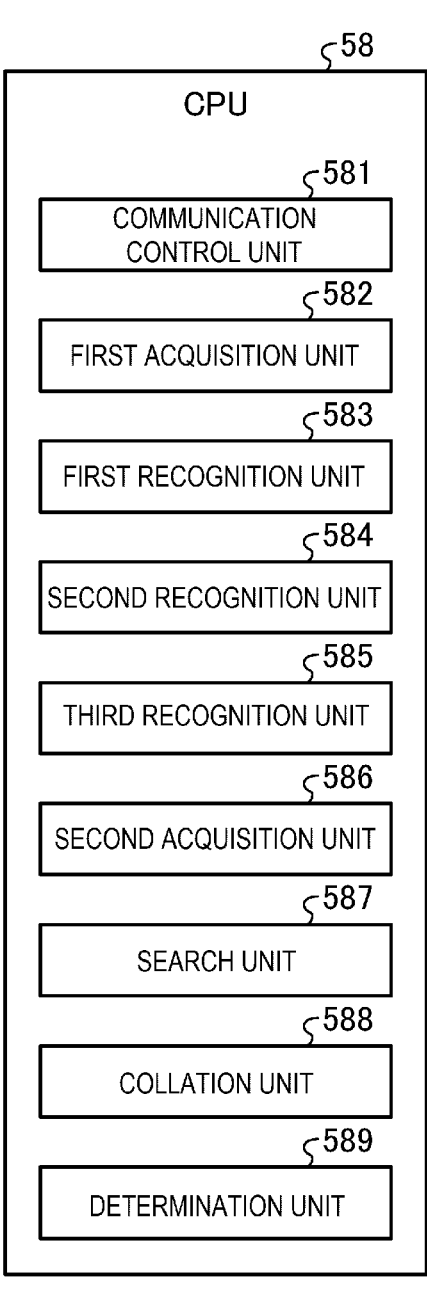
FIG. 28 is a block diagram showing an example of a functional configuration of the camera device.

Then, a configuration of the camera device 21 will be described using FIG. 27 and FIG. 28. FIG. 27 is a block diagram showing an example of a hardware configuration of the camera device related to the second embodiment. The camera device 21 is substantially the same in configuration as the camera device 2 shown in FIG. 6, but is different from the camera device 2 shown in FIG. 6 in that the controller 50 is provided with a CPU 58, and that a ranging sensor 59 is provided.

The ranging sensor 59 detects articles around the forklift 5. Further, the ranging sensor 59 detects distances from those articles. The ranging sensor 59 is, for example, a sensor device which performs article detection and measurement of a distance with an ultrasonic wave, or a sensor device such as light detection and ranging (LiDAR) which performs article detection with a laser beam.

Then, a functional configuration of the camera device 21 will be described. FIG. 28 is a block diagram showing an example of the functional configuration of the camera device 21 related to the second embodiment. In the present embodiment, the CPU 58 of the camera device 21 executes a program stored in the storage 54 or the like to thereby realize a variety of functions of the camera device 21.

The CPU 58 has a communication control unit 581, a first acquisition unit 582, a first recognition unit 583, a second recognition unit 584, a third recognition unit 585, a second acquisition unit 586, a search unit 587, a collation unit 588, and a determination unit 589. The first acquisition unit 582, the first recognition unit 583, the second recognition unit 584, the third recognition unit 585, and the second acquisition unit 586 are substantially the same as the first acquisition unit 512, the first recognition unit 513, the second recognition unit 514, the third recognition unit 515, and the second acquisition unit 516, and therefore, the description thereof will be omitted.

The communication control unit 581 controls transmission and reception of information with the server device 11 and the drive control device 4. For example, the communication control unit 581 receives the reception instruction of an article, the shipping instruction of an article, the transfer instruction of an article, and so on from the server device 11 via the communication I/F 55.

Further, for example, the communication control unit 581 transmits a variety of requests such as a move request for requesting to move the forklift 5 to a specific location in the warehouse to the drive control device 4 in substantially the same manner. Further, for example, the communication control unit 581 transmits a notice that an article is picked up, or a notice that an article is unloaded to the drive control device 4.

The search unit 587 searches for circumstances around the forklift 5. For example, the search unit 587 searches the periphery of the forklift 5 for an area (hereinafter also referred to as a vacant shelf) where an article can be stored based on a sensing result of the ranging sensor 59. It should be noted that the information of the area which is recognized as the vacant shelf as a result of the search by the search unit 587 may be stored in the storage 54 or the like. In this case, the search unit 587 may perform the search for the vacant shelf taking such information into consideration.

Further, for example, the search unit 587 searches for an article. As an example, in the reception processing of an article, when the forklift 5 moves to the arrival berth, the search unit 587 searches for the article as the reception target based on the sensing result of the ranging sensor 59. Here, the fact that the forklift 5 moves to the arrival berth can be recognized by, for example, the second acquisition unit 586 obtaining the location in real time.

Further, as another example, in the shipping processing or the transfer processing of an article, when the forklift moves to the location of the article as the shipping target or the transfer target, the search unit 587 searches for the article as the shipping target or the transfer target based on the sensing result of the ranging sensor 59.

Here, in the present embodiment, it is assumed that when the search unit 587 detects the presence of the article which is thought to be the article from the sensing result of the ranging sensor 59, the processing of obtaining the name of the article is performed by the first recognition unit 583.

The collation unit 588 performs the collation of the article name the shipping or the transfer of which is instructed by the server device 11 with the article name of the article which is found as a result of the search. For example, when the search unit 587 finds the article, the collation unit 588 collates article name obtained by the first recognition unit

583 as the name of that article with the name of the article the shipping or the transfer of which is instructed by the server device 11.

When the article names do not match each other as a result of the collation, the collation unit 588 may transmit a request of unloading the article to the drive control device 4 in cooperation with the communication control unit 581. When the forklift 5 unloads the article due to the control of the drive control device 4, the search unit 587 executes the search processing of the article once again.

The determination unit 589 determines whether there is a room (a space) for unloading the article. For example, in the reception processing of an article, when the forklift 5 moves to the location which is recognized as a vacant shelf, the determination unit 589 determines whether there is a space for unloading the article based on the sensing result of the ranging sensor 59.

Here, even when the area is recognized by the search unit 587 as the vacant shelf, there is a possibility that the article is placed in that area after the recognition is made, or a possibility that another object which is not an article subjected to the management in the warehouse is placed in that area by the worker or the like. Therefore, in the present embodiment, it is assumed that the determination unit 589 determines whether there is a space for unloading the article before the article is actually unloaded.

Referring back to FIG. 24, the explanation will be continued. The drive control device 4 is a device for controlling drive of the forklift 5. A configuration of the drive control device 4 will hereinafter be described using FIG. 29 and FIG. 30.

Figure 29:
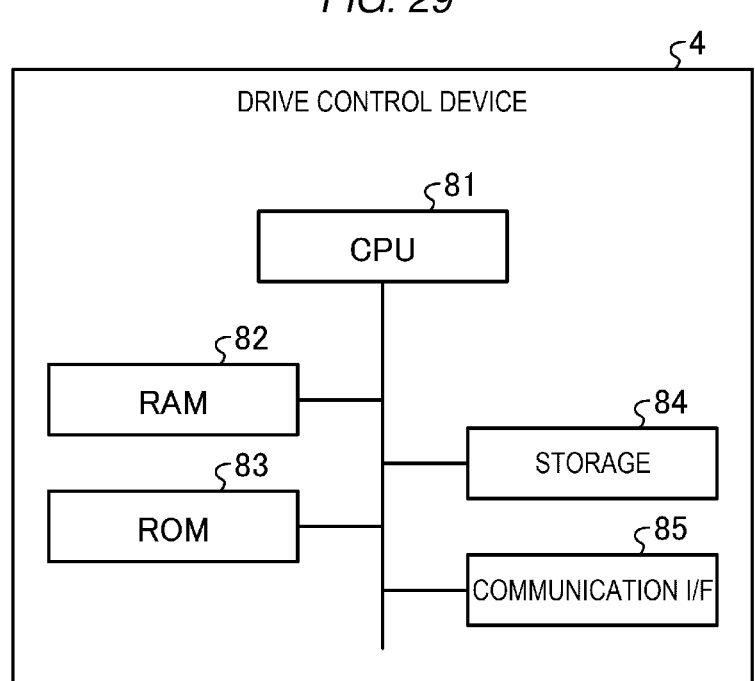
FIG. 29 is a block diagram showing an example of a hardware configuration of a drive control device related to the second embodiment.

First, a hardware configuration of the drive control device 4 will be described. FIG. 29 is a block diagram showing an example of the hardware configuration of the drive control device 4 related to the second embodiment. The drive control device 4 is provided with a CPU 81, a RAM 82, a ROM 83, a storage 84, and a communication I/F 85. These units 81 through 85 are coupled to each other via a data bus.

The CPU 81 performs overall control of the drive control device 4. For example, the CPU 81 uses the RAM 82 as a work area, and executes a program stored in the ROM 83, the storage 84, and so on to thereby execute a variety of types of processing. The storage 84 is a nonvolatile memory to which data can be written, and to which data can be rewritten. The communication I/F 85 is a device for establishing communication of a predetermined type with the camera device 21.

Figure 30:
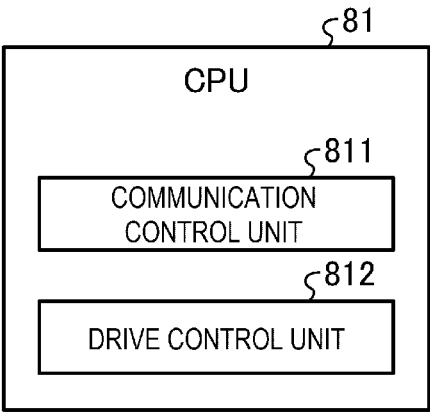
FIG. 30 is a block diagram showing an example of a functional configuration of the drive control device according to the second embodiment.

Then, a functional configuration of the drive control device 4 will be described. FIG. 30 is a block diagram showing an example of the functional configuration of the drive control device 4 according to the second embodiment. In the present embodiment, the CPU 81 of the drive control device 4 executes a program stored in the storage 84 or the like to thereby realize a variety of functions of the drive control device 4. The CPU 81 has a communication control unit 811 and a drive control unit 812.

The communication control unit 811 controls transmission and reception of information with the camera device 21. For example, the communication control unit 811 receives a variety of types of requests such as a move request to the arrival berth of an article, a move request to the shipping berth, and a move request to a storage location of an article from the camera device 21 via the communication I/F 85.

Further, for example, the communication control unit 811 receives a variety of notices such as the notice that an article is picked up, the notice that an article is unloaded, a notice of finding of an article, and a notice of permission to unloading an article from the camera device 21 in substantially the same manner.

The drive control unit 812 controls drive of the forklift 5. For example, the drive control unit 813 controls the drive wheels 75 and the turning wheels 76 of the forklift 5 to move the forklift 5 from the current location to the arrival berth in accordance with the move request to the arrival berth transmitted from the camera device 21.

As an example, the move request to the arrival berth includes information representing a path from the current location of the forklift 5 to the arrival berth, and the drive control unit 812 controls the drive wheels 75 and the turning wheels 76 so that the forklift moves on that path. It should be noted that substantially the same processing as described above is performed when moving to the shipping berth or moving to a shelf as a destination of transfer.

Further, when receiving the notice that the article is found from the camera device 21, the drive control unit 812 performs the control of picking-up the article. For example, the drive control unit 812 picks up the article by performing the control of inserting the fork 71 into the pallet loaded with the article, and then controlling an operation of the mast 73 to move up the position of the fork 71. It should be noted that on this occasion, in order to accurately insert the fork 71 into the pallet, the sensing result of the ranging sensor 59 of the camera device 21 may be used.

Further, when receiving the notice of permission to unload the article from the camera device 21, the drive control unit 812 performs the control of unloading the article. For example, the drive control unit 812 controls the operation of the mast 73 to move down the position of the fork 71, and then performs the control of moving the forklift backward to thereby unload the article.

It should be noted that a program which makes the drive control device 4 execute the processing for realizing such functions as described above can be provided as a file in a installable format or an executable format recorded on a computer-readable recording medium such as a CD-ROM, an FD, a CD-R, or a DVD. Further, the program may be provided or delivered via a network such as the Internet.

Figure 31:
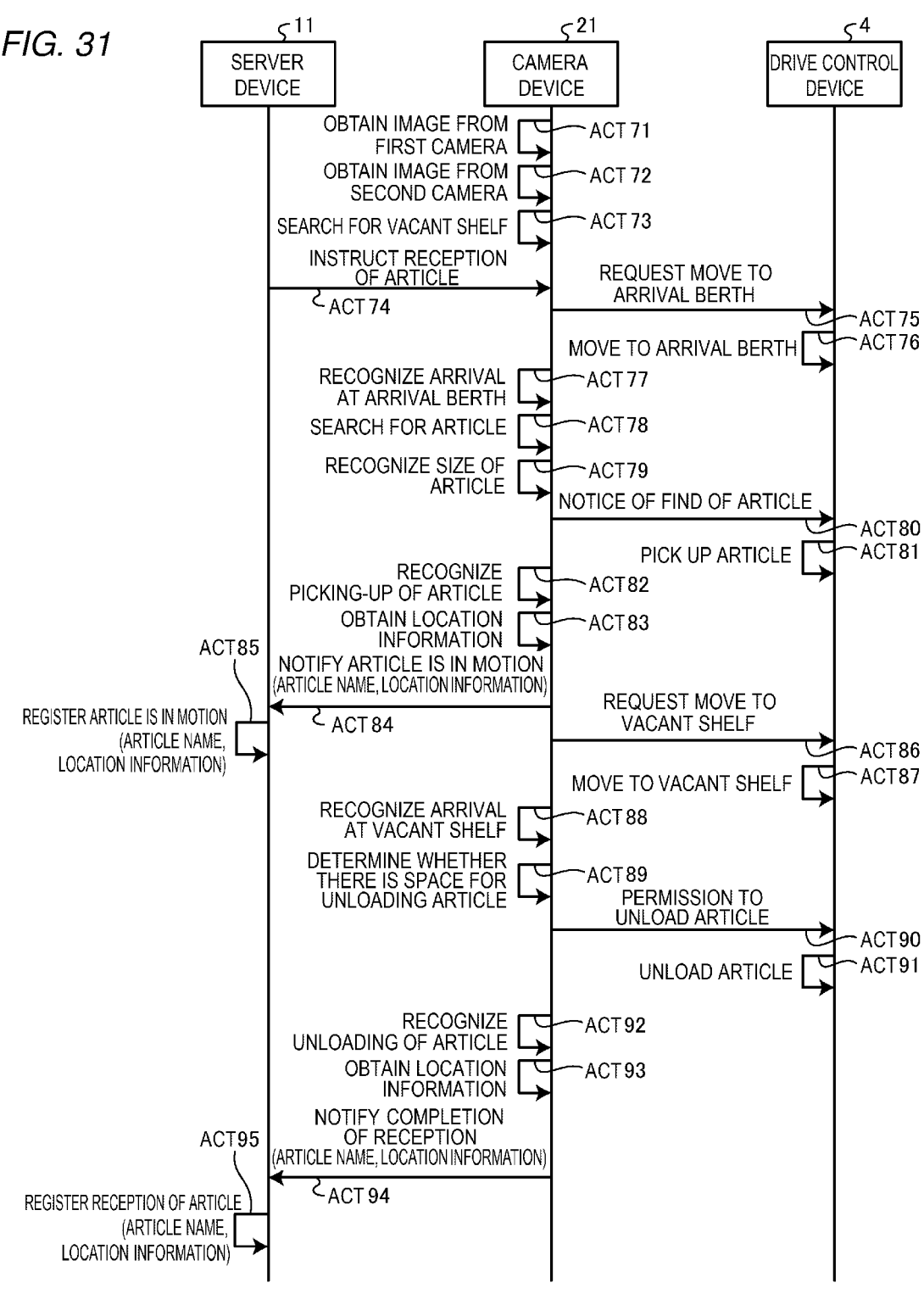
FIG. 31 is a sequence diagram showing an example of processing to be executed by the information processing system.

Then, processing to be executed by the information processing system Sa will be described. First, the reception processing of an article will be described. FIG. 31 is a sequence diagram showing an example of the processing to be executed by the information processing system Sa according to the second embodiment. FIG. 31 shows an example of processing when the forklift 5 which is automatically operated without an operator performs the reception processing. ACT71 and ACT72 are substantially the same as ACT1 and ACT2 in FIG. 21, and therefore, the description thereof will be omitted.

The search unit 587 of the camera device 21 searches (ACT73) for a vacant shelf. For example, the search unit 587 searches the periphery of the forklift 5 for the vacant shelf based on the sensing result of the ranging sensor 59.

It should be noted that the search processing for the vacant shelf is described in FIG. 31 as ACT73, but it is assumed that the processing in ACT73 is continuously executed. Further, the information of the area which is recognized as the vacant shelf as a result of the search is stored in the storage 55 or the like as vacant shelf information.

Further, the communication control unit 471 of the server device 11 transmits (ACT74) the reception instruction of an article to the camera device 21. For example, the communication control unit 471 transmits the reception instruction of an article to the camera device 21 via the communication I/F 45. The communication control unit 581 of the camera device 21 receives the reception instruction of an article via the communication I/F 55.

Then, the communication control unit 581 requests (ACT75) the forklift 5 to move to the arrival berth. For example, the communication control unit 581 transmits the move request to the arrival berth including the information representing the path from the current location of the forklift 5 to the arrival berth via the communication I/F 55. The communication control unit 811 of the drive control device 4 receives the move request.

Then, the drive control unit 812 performs (ACT76) the control of moving the forklift 5 to the arrival berth. For example, the drive control unit 812 performs the control of moving the forklift 5 to the arrival berth by controlling the drive wheels 75 and the turning wheels 76, based on the information representing the path from the current location to the arrival berth and included in the move request received from the camera device 21.

When the forklift 5 moves to the arrival berth, the search unit 587 of the camera device 21 recognizes (ACT77) that the forklift 5 moves to the arrival berth. For example, the search unit 587 recognizes that the forklift 5 moves to the arrival berth based on the location obtained by the second acquisition unit 586 in real time.

Subsequently, the search unit 587 searches (ACT78) for the article. For example, the search unit 587 moves the forklift 5 in the arrival berth in cooperation with the drive control device 4, and searches for the article based on the sensing result of the ranging sensor 59.

When the article is found as a result of the search, the first recognition unit 583 obtains the name of the article from the character string described on the slip attached to the article based on the image taken by the first camera 56. Further, on this occasion, the second recognition unit 584 recognizes (ACT79) the size of the article on the image taken by the first camera 56.

Subsequently, the communication control unit 581 transmits (ACT80) the notice that the article is found to the drive control device 4 via the communication I/F 55. The communication control unit 811 of the drive control device 4 receives the notice that the article is found. When receiving that notice, the drive control unit 812 performs (ACT81) the control of picking up the article on the forklift 5.

For example, the drive control unit 812 performs the control of moving the forklift 5 in front of the article, and then inserting the fork 71 into the pallet loaded with the article to thereby pick up the article. On this occasion, the drive control unit 812 may move the forklift 5 to a position suitable for picking up the article using the size of the article recognized in ACT79 and the sensing result of the ranging sensor 59.

ACT82 through ACT85 are substantially the same as ACT4, ACT5, ACT8, and ACT9 in FIG. 21, and therefore, the description thereof will be omitted. After ACT85, the communication control unit 581 requests (ACT86) the forklift 5 to move to the vacant shelf.

For example, the communication control unit 581 transmits the move request to the vacant shelf including the information representing the path from the current location of the forklift 5 to the vacant shelf via the communication I/F 55. As an example, the communication control unit 581 refers to the vacant shelf information to identify the closest vacant shelf to the current location (in the arrival berth) of the forklift 5. The communication control unit 581 transmits the move request including the path from the current location of the forklift 5 to that vacant shelf. The communication control unit 811 of the drive control device 4 receives the move request.

Then, the drive control unit 812 performs (ACT87) the control of moving the forklift 5 to the vacant shelf. For example, the drive control unit 812 performs the control of moving the forklift 5 to the vacant shelf by controlling the drive wheels 75 and the turning wheels 76, based on the information representing the path from the current location to the vacant shelf and included in the move request received from the camera device 21.

When the forklift 5 moves to the vacant shelf, the determination unit 589 of the camera device 21 recognizes (ACT88) that the forklift 5 arrives at the vacant shelf. For example, the determination unit 589 recognizes that the forklift 5 arrives at the vacant shelf based on the location obtained by the second acquisition unit 586 in real time.

Then, the determination unit 589 determines (ACT89) whether there is a space for unloading the article in the vacant shelf at which the forklift 5 arrives. For example, the determination unit 589 determines whether there is the space for unloading the article based on the size of the article recognized in ACT79 and the sensing result of the ranging sensor 59.

Although not shown in the drawings, when it is determined that there is no space for unloading the article, the communication control unit 581 may refer to the vacant shelf information to identify the closest vacant shelf to the current location of the forklift 5. In this case, the communication control unit 581 may transmit the move request including the information representing the path from the current location of the forklift 5 to the vacant shelf thus identified to the drive control device 4.

When it is determined in ACT89 that there is the space for unloading the article, the communication control unit 581 transmits (ACT90) the notice of permission to unload the article to the drive control device 4 via the communication I/F 55. The communication control unit 811 of the drive control device 4 receives that notice.

When receiving that notice, the drive control unit 812 performs (ACT91) the control of unloading the article. For example, the drive control unit 812 performs the control of unloading the article by controlling the operation of the mast 73 to move down the fork 71, and performing the control of moving the forklift 5 backward to thereby withdraw the fork 71 from the pallet loaded with the article.

ACT92 through ACT95 are substantially the same as ACT10, ACT11, ACT14, and ACT15 in FIG. 21, and therefore, the description thereof will be omitted.

Figure 32:
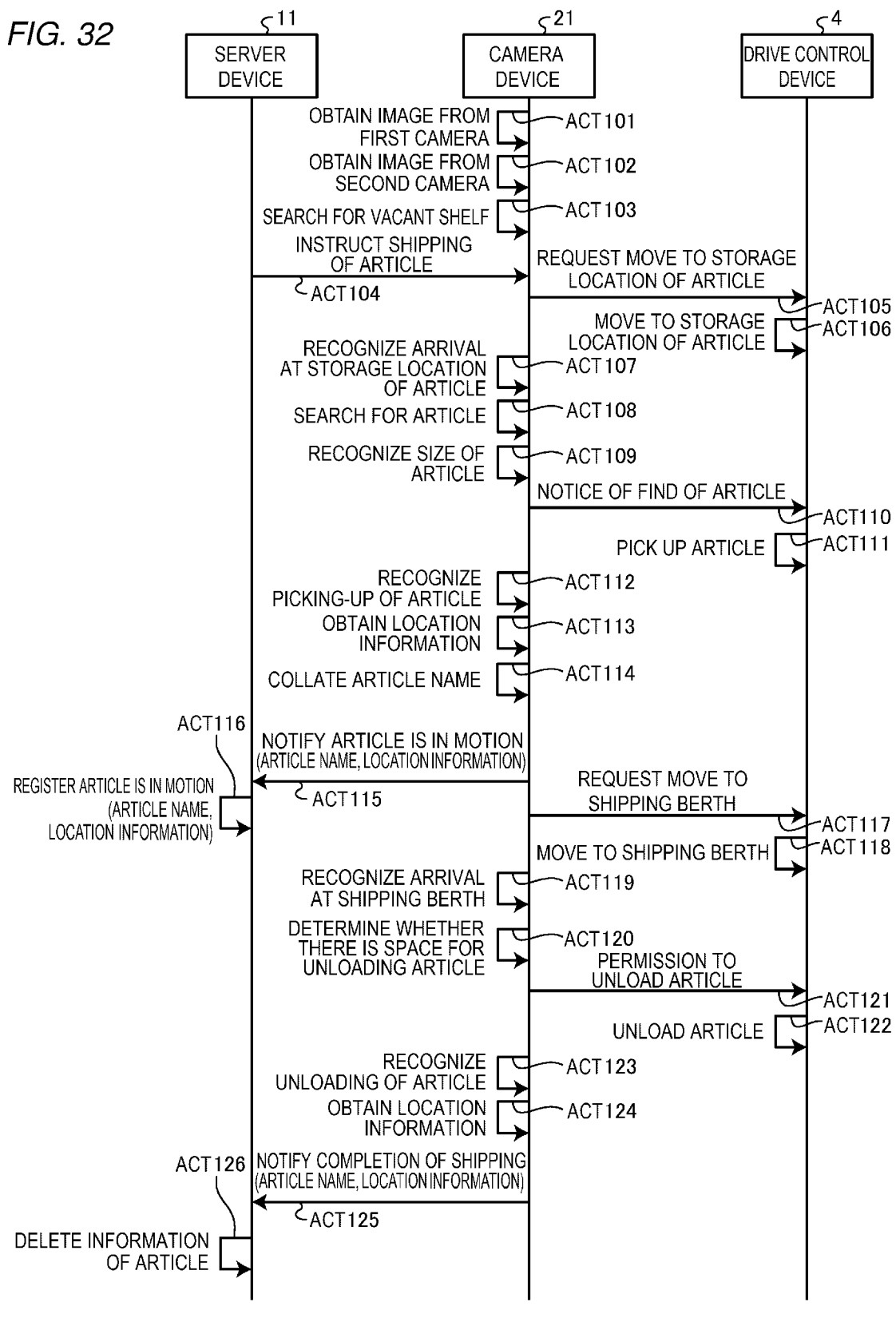
FIG. 32 is a sequence diagram showing an example of the processing to be executed by the information processing system.

Then, the shipping processing of an article will be described. FIG. 32 is a sequence diagram showing an example of the processing to be executed by the information processing system Sa according to the second embodiment. FIG. 32 shows an example of processing when the forklift 5 which is automatically operated without an operator performs the shipping processing. ACT101 through ACT103 are substantially the same as ACT71 through ACT73 in FIG. 31, and therefore, the description thereof will be omitted.

The communication control unit 471 of the server device 11 transmits (ACT104) the shipping instruction of an article to the camera device 21. For example, the communication control unit 471 transmits the shipping instruction of an article to the camera device 21 via the communication I/F 45. The shipping instruction of an article includes the article name of the article to be shipped, and the location where the article is stored. The communication control unit 581 of the camera device 21 receives the shipping instruction of an article via the communication I/F 55.

Then, the communication control unit 581 requests (ACT105) the forklift 5 to move to the storage location of the article shipping of which is instructed. For example, the communication control unit 581 transmits the move request to the storage location of the article including the information representing the path from the current location of the forklift 5 to the storage location of the article via the communication I/F 55. The communication control unit 811 of the drive control device 4 receives the move request.

Then, the drive control unit 812 performs (ACT106) the control of moving the forklift 5 to the storage location of the article. For example, the drive control unit 812 performs the control of moving the forklift 5 to the storage location of the article by controlling the drive wheels 75 and the turning wheels 76, based on the information representing the path from the current location to the storage location and included in the move request received from the camera device 21.

When the forklift 5 moves to the storage location of the article, the search unit 587 of the camera device 21 recognizes (ACT107) that the forklift 5 moves to the storage location of the article. For example, the search unit 587 recognizes that the forklift 5 moves to the storage location of the article based on the location obtained by the second acquisition unit 586 in real time.

ACT108 through ACT113 are substantially the same as ACT78 through ACT83 in FIG. 31, and therefore, the description thereof will be omitted. After ACT113, the collation unit 588 collates (ACT114) the article name of the article related to the shipping instruction with the article name of the article which is found. For example, the collation unit 613 collates the article name included in the shipping instruction of the article transmitted from the server device 11 with the article name obtained by the first recognition unit 583 when searching for the article.

Although not shown in the drawings, when the article names do not match each other as a result of the collation, the search unit 587 may perform the search processing for the article in ACT108 until the article names match each other.

When the article names match each other as a result of the collation, the transition to the processing in ACT115 is made, but the description will be omitted since ACT115 and ACT116 are substantially the same as ACT84 and ACT85 in FIG. 31. After ACT116, the communication control unit 581 requests (ACT117) the forklift 5 to move to the shipping berth.

For example, the communication control unit 581 transmits the move request to the shipping berth including the information representing the path from the current location of the forklift 5 to the shipping berth via the communication I/F 55. As an example, the communication control unit 581 transmits the move request including the path from the current location of the forklift 5 to the shipping berth. The communication control unit 811 of the drive control device 4 receives the move request.

Then, the drive control unit 812 performs (ACT118) the control of moving the forklift 5 to the shipping berth. For example, the drive control unit 812 performs the control of moving the forklift 5 to the shipping berth by controlling the drive wheels 75 and the turning wheels 76, based on the information representing the path from the current location to the shipping berth and included in the move request received from the camera device 21.

When the forklift 5 moves to the shipping berth, the determination unit 589 of the camera device 21 recognizes (ACT119) that the forklift 5 arrives at the shipping berth. For example, the determination unit 589 recognizes that the forklift 5 arrives at the shipping berth based on the location obtained by the second acquisition unit 586 in real time.

Then, the determination unit 589 determines (ACT120) whether there is a space for unloading the article in the shipping berth at which the forklift 5 arrives. For example, the determination unit 589 determines whether there is the space for unloading the article based on the size of the article recognized in ACT109 and the sensing result of the ranging sensor 59.

Although not shown in the drawings, when it is determined that there is no space for unloading the article, the communication control unit 581 may transmit a message that there is no space for placing the article for shipping in the shipping berth to an administrator of the server device 11, a manager of the warehouse, and so on. Further, the search unit 587 may search for a space for unloading the article while moving the forklift 5 in the shipping berth in cooperation with the drive control device 4.

ACT121 through ACT124 are substantially the same as ACT90 through ACT93 in FIG. 31, and therefore, the description thereof will be omitted. Further, ACT125 and ACT126 are substantially the same as ACT47 and ACT48 in FIG. 22, and therefore, the description thereof will be omitted.

Figure 33:
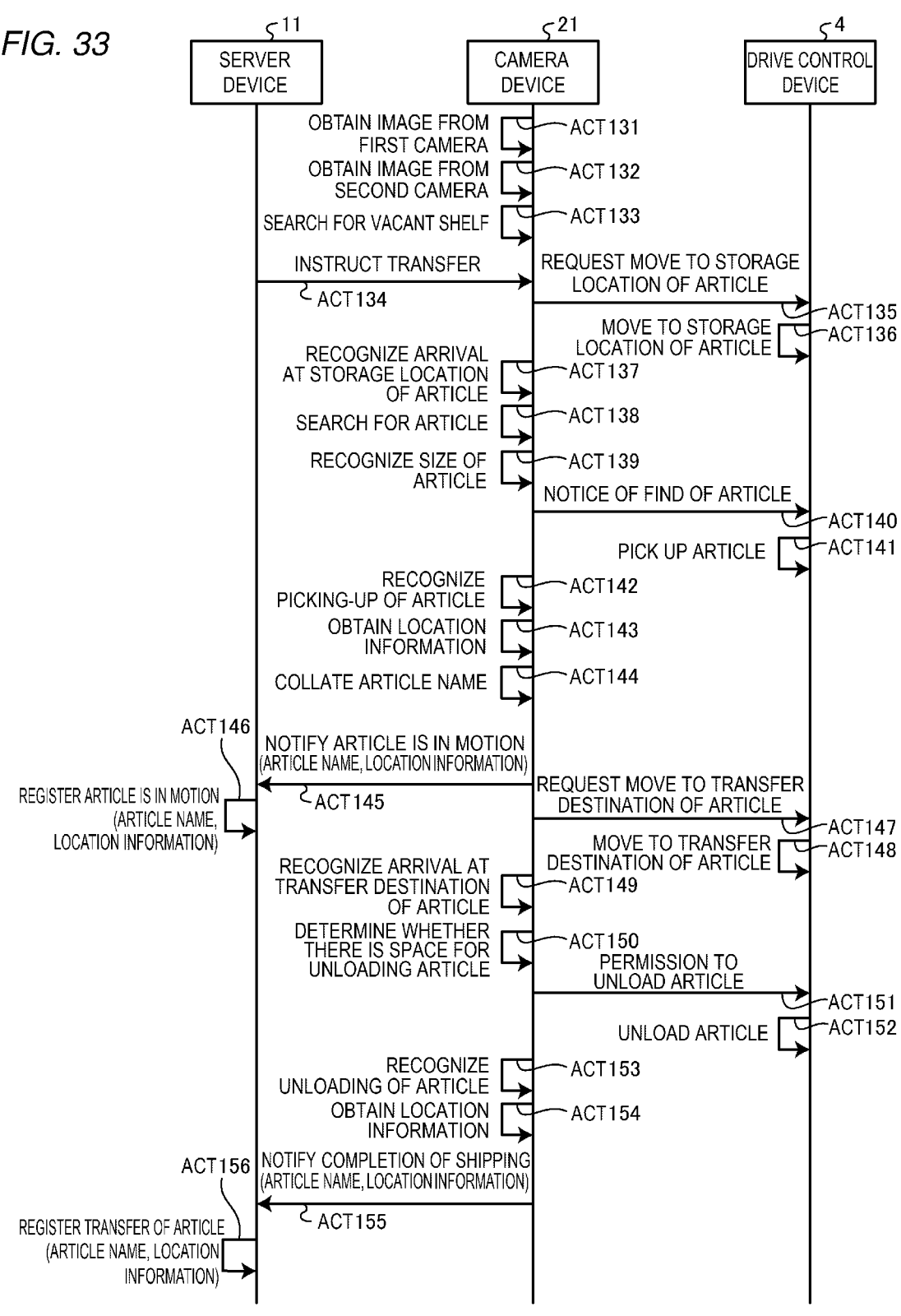
FIG. 33 is a sequence diagram showing an example of processing to be executed by the information processing system.

Then, the transfer processing of an article will be described. FIG. 33 is a sequence diagram showing an example of the processing to be executed by the information processing system Sa according to the second embodiment. FIG. 33 shows an example of processing when the forklift 5 which is automatically operated without an operator performs the transfer processing. ACT131 through ACT133 are substantially the same as ACT101 through ACT103 in FIG. 32, and therefore, the description thereof will be omitted.

The communication control unit 471 of the server device 11 transmits (ACT134) the transfer instruction of an article to the camera device 21. For example, the communication control unit 471 transmits the transfer instruction of an article to the camera device 21 via the communication I/F 45. The transfer instruction of an article includes the article name of the article to be transferred, the location where the article is stored, and a location representing a transfer destination of the article. The communication control unit 581 of the camera device 21 receives the transfer instruction of an article via the communication I/F 55.

ACT135 through ACT146 are substantially the same as ACT105 through ACT116 in FIG. 32, and therefore, the description thereof will be omitted. After ACT146, the communication control unit 581 requests (ACT147) the forklift 5 to move to the transfer destination of the article.

For example, the communication control unit 581 transmits the move request to the transfer destination including the information representing a path from the current location of the forklift 5 to the transfer destination via the communication I/F 55. As an example, the communication control unit 581 transmits the move request including the path from the current location of the forklift 5 to the transfer destination of the article included in the transfer instruction received from the server device 11. The communication control unit 811 of the drive control device 4 receives the move request.

Then, the drive control unit 812 performs (ACT148) the control of moving the forklift 5 to the transfer destination of the article. For example, the drive control unit 812 performs the control of moving the forklift 5 to the transfer destination of the article by controlling the drive wheels 75 and the turning wheels 76, based on the information representing the path from the current location to the transfer destination and included in the move request received from the camera device 21.

When the forklift 5 moves to the transfer destination of the article, the determination unit 589 of the camera device 21 recognizes (ACT149) that the forklift 5 arrives at the transfer destination of the article. For example, the determination unit 589 recognizes that the forklift 5 arrives at the transfer destination based on the location obtained by the second acquisition unit 586 in real time.

Then, the determination unit 589 determines (ACT150) whether there is a space for unloading the article in the transfer destination of the article at which the forklift 5 arrives. For example, the determination unit 589 determines whether there is the space for unloading the article based on the size of the article recognized in ACT139 and the sensing result of the ranging sensor 59.

Although not shown in the drawings, when it is determined that there is no space for unloading the article, the communication control unit 581 may transmit a message that there is no space for placing the article in the area designated as the transfer destination to the administrator of the server device 11, the manager of the warehouse, and so on.

ACT151 through ACT154 are substantially the same as ACT121 through ACT124 in FIG. 32, and therefore, the description thereof will be omitted. Further, ACT155 and ACT156 are substantially the same as ACT67 and ACT68 in FIG. 23, and therefore, the description thereof will be omitted.

As described above, in the information processing system Sa according to the present embodiment, the processing such as the reception, the shipping, and the transfer of the article is performed by the forklift 5 which is automatically operated without an operator.

For example, when performing the conveyance of an article and at the same time arranging articles in a free-location manner using the forklift or the like which is automatically operated without an operator, the location where the article is actually disposed and the location where the article is disposed on records are different from each other in some cases. It is conceivable that this occurs on the grounds that it is recognized in the system that the article is unloaded despite that the article is not unloaded in reality, or that it is regarded in the system that the article in not unloaded despite that the article is unloaded in reality. In order to prevent this, it is conceivable to take a countermeasure that a human determines whether the article is picked up or whether the article is unloaded. However, in this case, a human is required to perform the action of determination despite that the unmanned transfer of an article is achieved, which has a possibility that a sufficient advantage cannot be obtained.

In contrast, the camera device 21 related to the present embodiment can automatically recognize that the article is picked up and that the article is unloaded from the images taken by the cameras. Therefore, according to the camera device 21 related to the present embodiment, even when achieving the unmanned transfer of articles, and at the same time, arranging the articles in a free-location manner, it is possible to correctly record the layout positions (the storage locations) of the articles without consulting a human. In other words, according to the present embodiment, it is possible to enhance the convenience of the article management in the warehouse where the articles are arranged in a free-location manner.

It should be noted that the first embodiment and the second embodiment described above can also be implemented with modifications as appropriate by changing some of the constituents or the functions provided to the information processing system S (Sa). Therefore, some modified examples related to the embodiments described above will hereinafter be described as other embodiments. It should be noted that hereinafter issues different from those of the embodiment described above will mainly be described, and regarding issues common to the contents already described, the detailed description will be omitted. Further, the modified examples described hereinafter may individually be implemented, or may be implemented in combination as appropriate.

Modified Example 1

In the first embodiment and the second embodiment described above, there is described the aspect in which the location (the location information) is obtained based on the second camera 57 and the two-dimensional code for recognizing the location. In the present modified example, an aspect in which the location information is obtained using a sensor such as a gyro sensor will be described.

The forklift 5 in the present modified example is provided with a gyro sensor instead of the second camera 57. An example of an installation position of the gyro sensor in the forklift 5 will hereinafter be described using FIG. 34 and FIG. 35.

Figure 34:
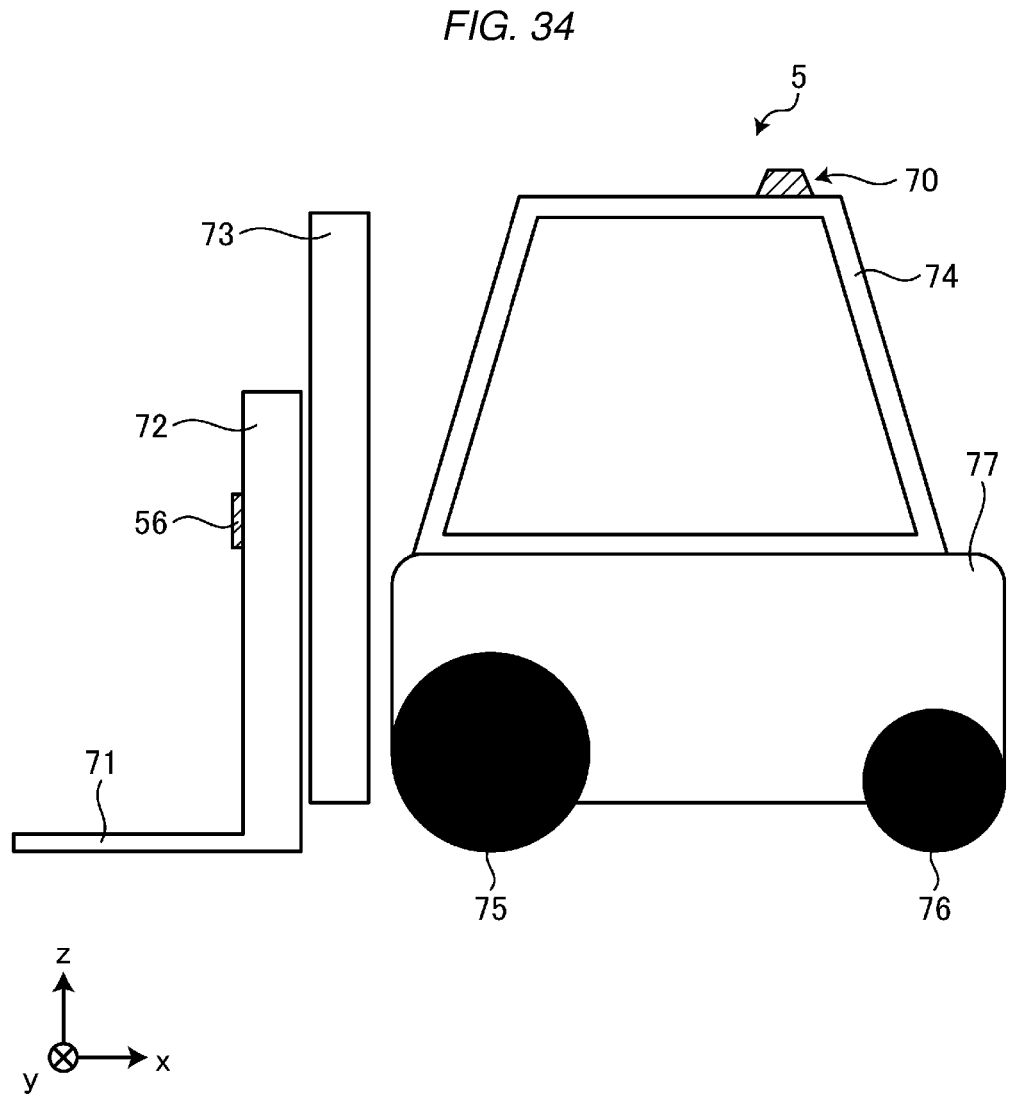
FIG. 34 is a schematic diagram showing an example of installation positions of a camera and a gyro sensor in a forklift related to Modified Example 1.
Figure 35:
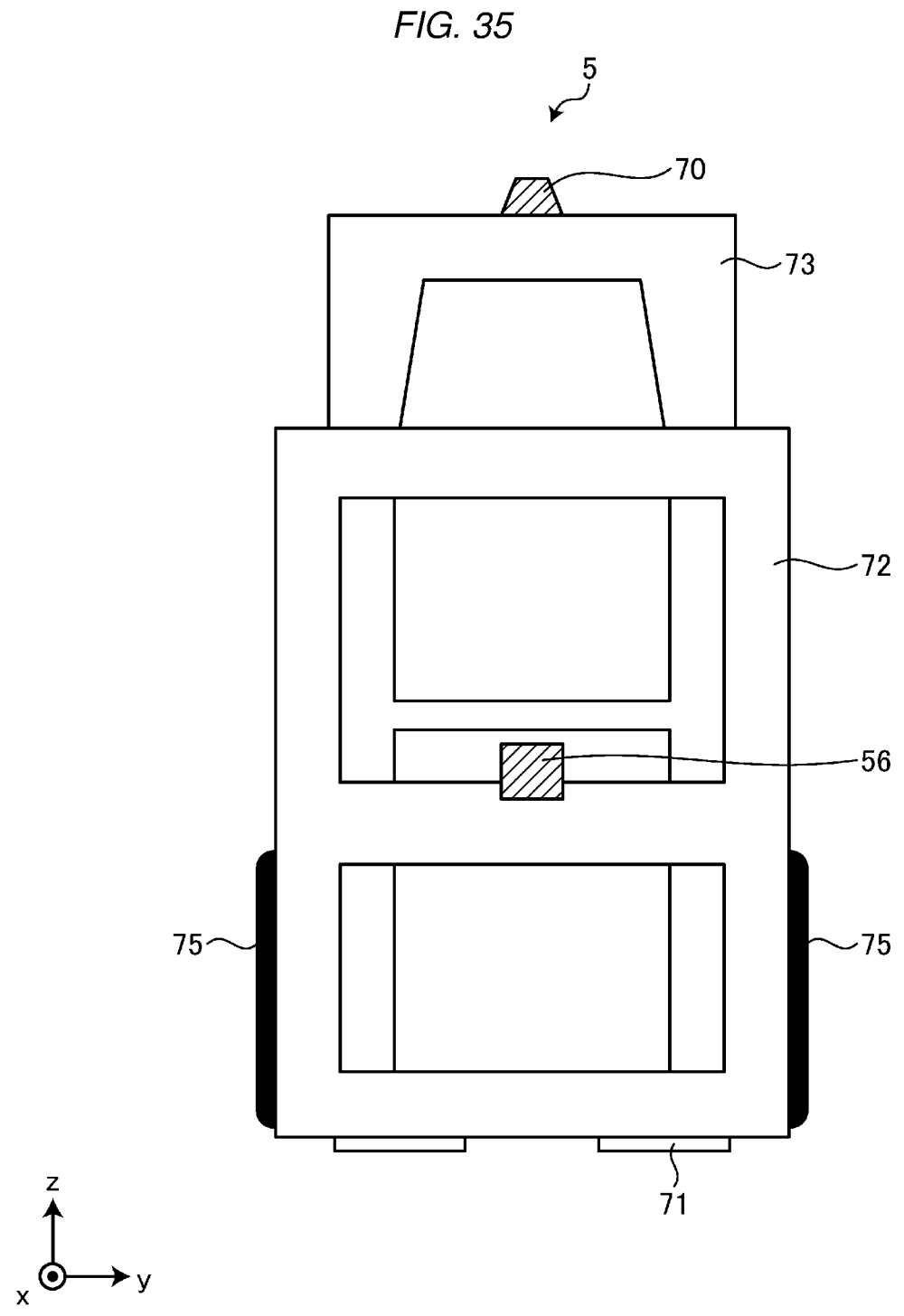

FIG. 34 and FIG. 35 are schematic diagrams showing an example of the installation positions of the camera and the gyro sensor in the forklift related to Modified Example 1. FIG. 34 shows an example of a view of the forklift 5 related to Modified Example 1 from a lateral side. FIG. 35 shows an example of a view of the forklift 5 related to Modified Example 1 from the front side.

As shown in FIG. 34 and FIG. 35, the forklift 5 related to the present modified example is provided with the gyro sensor 70 on the head guard 74. Further, the second camera 57 is not disposed on the mast 73 unlike the forklift 5 related to the first embodiment and the second embodiment. The gyro sensor 70 is a sensor for measuring rotational angular velocity. The gyro sensor 70 is an example of a position measurement sensor.

The second acquisition unit 516 (586) in the present modified example obtains the location information representing the current location of the forklift 5 based on a sensing result of the gyro sensor 70, and then obtains the location of the target article from that location information. For example, the second acquisition unit 516 (586) detects a change in proceeding direction of the forklift 5 based on the sensing result of the gyro sensor 70 to thereby identify the current location of the forklift 5.

Here, in the present modified example, an offset value for converting the location information representing the location at which the gyro sensor 70 is disposed into location information of a tip of the fork 71 is prepared in advance. The second acquisition unit 516 converts the location information representing the current location of the forklift 5 identified by the gyro sensor 70 into the location information representing the location of the tip of the fork 71 using the offset value. Then, the second acquisition unit 516 (586) obtains that location information obtained by the conversion as the location information of the target article.

In the present modified example, the second acquisition unit 516 (586) obtains the location information representing the current location of the forklift 5 when the second recognition unit 514 (584) recognizes that the article is unloaded. Further, the second acquisition unit 516 (586) converts that location information into the location information of the tip of the fork 71 using the offset value prepared in advance. Then, the second acquisition unit 516 (586) obtains the location information obtained by the conversion as the location information representing the location of the article when the second recognition unit 514 (584) recognizes that the article is unloaded.

The communication control unit 511 (581) transmits the location information to the server device 1 (11) together with the article name obtained by the first recognition unit 513 (583).

It should be noted that the second acquisition unit 516 (586) may continuously obtain the location information representing the current location of the forklift 5 irrespective of whether the second recognition unit 514 (584) recognizes that the article is unloaded. Thus, it is possible for the administrator of the server device 1 (11), the manager of the warehouse, and so on to always figure out the current location of the forklift 5.

According to the present modified example, it is possible to obtain the location information representing the location where the article is unloaded without providing the barcodes, the two-dimensional codes, or the like for recognizing the location to the shelves.

It should be noted that although the location information representing the current location of the forklift 5 is obtained using the gyro sensor in the present modified example, the location information representing the current location of the forklift 5 may be obtained using a sensor other than the gyro sensor such as an acceleration sensor or a GPS sensor.

Modified Example 2

The aspect in which the moving vehicle which conveys the articles is the forklift is explained in the first embodiment, the second embodiment, and Modified Example 1 described above, but the moving vehicle which conveys the articles is not limited to the forklift. For example, the moving vehicle which conveys the articles can be a crane. As an example, when the moving vehicle which conveys the articles is the crane, at least one camera is disposed around a hook of the crane. Further, a sensor for position measurement may be disposed together with the camera.

According to the present modified example, even when conveying the articles using a conveyance device other than the forklift, it is possible to enhance the convenience of the article management in the warehouse in which the articles are arrange in a free-location manner.

Although the embodiments of the present disclosure are hereinabove described, the embodiments are illustrative only, and it is not intended to limit the scope of the present disclosure. The novel embodiments described above can be implemented with other various aspects, and a variety of omissions, replacements, and modifications can be made within the scope or the spirit of the present disclosure. The embodiments and the modifications thereof are included in the scope of the disclosure, and at the same time, included in the disclosure set forth in the appended claims and the equivalents thereof.

What is claimed is:

1. An information processing device, comprising:
a first acquisition component configured to obtain an image from a camera installed in a moving vehicle, the moving vehicle configured to convey an article;
a first recognition component configured to recognize a symbol attached to the article from the image to obtain identification information identifying the article from the symbol;
a second recognition component configured to recognize an action performed on the article by the moving vehicle based on a change in size of the symbol recognized by the first recognition component from the image, wherein the change in the size is an increase in the size of the symbol or a decrease in the size of the symbol;
a second acquisition component configured to obtain location information of the article when an action of the moving vehicle is recognized; and
an output component configured to output association information obtained by associating the identification information of the article represented by the symbol and the location information of the article with each other in accordance with an action content recognized by the second recognition component.

2. The information processing device according to claim 1, wherein
the second recognition component is further configured to recognize that a first action of picking up the article is performed when the size of the symbol continuously increases and an increasing state continues for a predetermined time, and recognize that a second action of unloading the article is performed when the size continuously decreases from the increasing state, and
the output component is further configured to output the association information when at least one of the first action and the second action is recognized.

3. The information processing device according to claim 2, wherein
the second recognition component is further configured to recognize that the first action is performed when at least one of conditions, (a) the size of the symbol on the image is a predetermined size, (b) a slip on which the symbol is printed, and which is attached to the article is recognized as an object, (c) the symbol on the image is located at a predetermined position, and (d) a distance to the article obtained using a ranging sensor is within a predetermined range, is satisfied in addition to the size of the symbol continuously increases and the increasing state continues for the predetermined time.

4. The information processing device according to claim 1, wherein
the article is received in a warehouse in which the article is stored, or shipped from the warehouse,
a code symbol obtained by coding information representing a location in the warehouse is disposed in the warehouse, and
the second acquisition component is configured to obtain the location in the warehouse identified based on a reading result of the code symbol included in the image as the location information of the article when the second recognition component recognizes that an action of the moving vehicle on the article is performed.

5. The information processing device according to claim 1, wherein the second acquisition component is further configured to obtain the location information of the article from a location of the moving vehicle identified based on a measurement result of a position measurement sensor installed in the moving vehicle when the second recognition component recognizes that an action of the moving vehicle on the article is performed.

6. The information processing device according to claim 1, wherein the first acquisition component is configured to obtain images from a plurality of cameras installed in a corresponding plurality of moving vehicles, moving vehicles of the corresponding plurality of moving vehicles are configured to convey a plurality of articles.

7. The information processing device according to claim 1, wherein the first acquisition component is configured to obtain images from a plurality of cameras installed in the moving vehicle.

8. An information processing system, comprising:
an information processing device; and
a server device, wherein
the information processing device includes:
a first acquisition component configured to obtain an image from a camera installed in a moving vehicle, the moving vehicle configured to convey an article,
a first recognition component configured to recognize a symbol attached to the article from the image to obtain identification information identifying the article from the symbol,
a second recognition component configured to recognize an action performed on the article by the moving vehicle based on a change in size of the symbol recognized by the first recognition component from the image, wherein the change in the size is an increase in the size of the symbol or a decrease in the size of the symbol,
a second acquisition component configured to obtain location information of the article when an action of the moving vehicle is recognized, and
an output component configured to output association information obtained by associating the identification information of the article represented by the symbol and the location information of the article with each other in accordance with an action content recognized by the second recognition component, and
the server device includes:
a reception component configured to receive the association information, and
a storage controller configured to store the association information in a storage device.

9. The information processing system according to claim 8, wherein
the second recognition component is further configured to recognize that a first action of picking up the article is performed when the size of the symbol continuously increases and an increasing state continues for a predetermined time, and recognize that a second action of unloading the article is performed when the size continuously decreases from the increasing state, and
the output component is further configured to output the association information when at least one of the first action and the second action is recognized.

10. The information processing system according to claim 9, wherein
the second recognition component is further configured to recognize that the first action is performed when at least one of conditions, (a) the size of the symbol on the image is a predetermined size, (b) a slip on which the symbol is printed, and which is attached to the article is recognized as an object, (c) the symbol on the image is located at a predetermined position, and (d) a distance to the article obtained using a ranging sensor is within a predetermined range, is satisfied in addition to the size of the symbol continuously increases and the increasing state continues for the predetermined time.

11. The information processing system according to claim 8, wherein the article is received in a warehouse in which the article is stored, or shipped from the warehouse, a code symbol obtained by coding information representing a location in the warehouse is disposed in the warehouse, and the second acquisition component is configured to obtain the location in the warehouse identified based on a reading result of the code symbol included in the image as the location information of the article when the second recognition component recognizes that an action of the moving vehicle on the article is performed.

12. The information processing system according to claim 8, wherein the second acquisition component is further configured to obtain the location information of the article from a location of the moving vehicle identified based on a measurement result of a position measurement sensor installed in the moving vehicle when the second recognition component recognizes that an action of the moving vehicle on the article is performed.

13. The information processing system according to claim 8, wherein the first acquisition component is configured to obtain images from a plurality of cameras installed in a corresponding plurality of moving vehicles, moving vehicles of the corresponding plurality of moving vehicles are configured to convey a plurality of articles.

14. The information processing system according to claim 8, wherein the first acquisition component is configured to obtain images from a plurality of cameras installed in the moving vehicle.

15. A method of controlling an information processing device, comprising:

obtaining an image from a camera installed in a moving vehicle, the moving vehicle configured to convey an article;

recognizing a symbol attached to the article from the image to obtain identification information identifying the article from the symbol;

recognizing an action performed on the article by the moving vehicle based on a change in size of the symbol recognized from the image in the recognizing the symbol attached to the article, wherein the change in the size is an increase in the size of the symbol or a decrease in the size of the symbol;

obtaining location information of the article when an action of the moving vehicle is recognized; and outputting association information obtained by associating the identification information of the article represented by the symbol and the location information of the article with each other in accordance with an action content recognized in the recognizing an action performed on the article.

16. The method according to claim 15, further comprising:

recognizing that a first action of picking up the article is performed when the size of the symbol continuously increases and an increasing state continues for a predetermined time;

recognizing that a second action of unloading the article is performed when the size continuously decreases from the increasing state; and outputting the association information when at least one of the first action and the second action is recognized.

17. The method according to claim 16, further comprising:

recognizing that the first action is performed when at least one of conditions, (a) the size of the symbol on the image is a predetermined size, (b) a slip on which the symbol is printed, and which is attached to the article is recognized as an object, (c) the symbol on the image is located at a predetermined position, and (d) a distance to the article obtained using a ranging sensor is within a predetermined range, is satisfied in addition to the size of the symbol continuously increases and the increasing state continues for the predetermined time.

18. The method according to claim 15, further comprising:

receiving the article in a warehouse in which the article is stored, or shipped from the warehouse;

disposing in the warehouse a code symbol obtained by coding information representing a location in the warehouse; and obtaining the location in the warehouse identified based on a reading result of the code symbol included in the image as the location information of the article when recognizing that an action of the moving vehicle on the article is performed.

19. The method according to claim 15, further comprising:

obtaining the location information of the article from a location of the moving vehicle identified based on a measurement result of a position measurement sensor installed in the moving vehicle when recognizing that an action of the moving vehicle on the article is performed.

20. The method according to claim 15, further comprising:

obtaining images from a plurality of cameras installed in the moving vehicle.

* * * * *